(12) United States Patent
Shah

(10) Patent No.: US 10,489,830 B2
(45) Date of Patent: Nov. 26, 2019

(54) AGGREGATION OF RATING INDICATORS

(71) Applicant: Netspective Communications LLC, Silver Spring, MD (US)

(72) Inventor: Shahid N. Shah, Silver Spring, MD (US)

(73) Assignee: Netspective Communications LLC, Silver Spring, MD (US)

(*) Notice: Subject to any disclaimer, the term of this patent is extended or adjusted under 35 U.S.C. 154(b) by 268 days.

(21) Appl. No.: 15/813,109

(22) Filed: Nov. 14, 2017

(65) Prior Publication Data

US 2018/0075496 A1  Mar. 15, 2018

Related U.S. Application Data

(63) Continuation of application No. 14/744,697, filed on Jun. 19, 2015, now Pat. No. 9,846,896.

(60) Provisional application No. 62/015,503, filed on Jun. 22, 2014.

(51) Int. Cl.
    *G06F 17/30* (2006.01)
    *G06Q 30/02* (2012.01)

(52) U.S. Cl.
    CPC .................. *G06Q 30/0282* (2013.01)

(58) Field of Classification Search
    CPC .................................. G06Q 30/0282
    See application file for complete search history.

(56) References Cited

U.S. PATENT DOCUMENTS

| | | | |
|---|---|---|---|
| 8,417,713 B1 | 4/2013 | Blair-Goldensohn et al. | |
| 8,447,643 B2* | 5/2013 | Barnes, Jr. | G06F 3/04847 |
| | | | 705/7.29 |
| 8,671,098 B2 | 3/2014 | Salvetti et al. | |
| 8,731,995 B2 | 5/2014 | Sun et al. | |
| 8,862,591 B2 | 10/2014 | Chowdhury et al. | |
| 9,043,325 B1 | 5/2015 | Moczydlowski | |
| 2002/0133365 A1 | 9/2002 | Grey | |
| 2010/0332405 A1 | 12/2010 | Williams | |
| 2011/0055104 A1* | 3/2011 | Sun | G06Q 10/10 |
| | | | 705/347 |
| 2013/0332385 A1 | 12/2013 | Kilroy et al. | |
| 2015/0347413 A1 | 12/2015 | Brady | |

\* cited by examiner

*Primary Examiner* — Apu M Mofiz
*Assistant Examiner* — Husam Turki Samara
(74) *Attorney, Agent, or Firm* — Rahman LLC

(57) ABSTRACT

A computer-implemented method and system for publishing an aggregate rating indicator based on a plurality of discrete rating indicators associated with a rated entity. The method includes searching a plurality of repositories containing the plurality of discrete rating indicators associated with the rated entity. The method may include retrieving a first rating indicator, a second rating indicator, and a third rating indicator. At least one of the first rating indicator, the second rating indicator, and the third rating indicator may be a fraudulent rating indicator. The method may include filtering out the fraudulent rating indicator from among the first, second, and third rating indicators, wherein the fraudulent rating indicator is determined based on a combination of parameters. The method may include aggregating the first, second, and third rating indicators after filtering out the fraudulent rating indicator such that the aggregation results in an aggregate rating indicator.

20 Claims, 14 Drawing Sheets

801 →

Dr. Al Common Procedures

The chart below shows how many procedures Dr. Al performed in 2012 for patients covered by Medicare.

| Procedure | Performed in 2012 | Individual Patients | Medicare Charge * |
|---|---|---|---|
| Eye exam established pat | 120 | 88 | $120 |
| Eye exam & treatment | 190 | 149 | $177 |
| Office/outpatient visit est | 160 | 135 | $198 |
| Ophthalmic biometry | 209 | 126 | $188 |

Dr. Mike Common Procedures

The chart below shows how many procedures Dr. Mike performed in 2012 for patients covered by Medicare.

| Procedure | Performed in 2012 | Individual Patients | Medicare Charge * |
|---|---|---|---|
| Eye exam established pat | 143 | 98 | $ 120 |
| Eye exam & treatment | 210 | 149 | $ 177 |
| Office/outpatient visit est | 235 | 189 | $ 198 |
| Ophthalmic biometry | 336 | 250 | $ 188 |
| Special eye evaluation | 450 | 300 | $ 125 |
| Cataract surg w/iol 1 stage | 209 | 180 | $ 2000 |

FIG. 8B

AGGREGATION OF RATING INDICATORS

CROSS-REFERENCE TO RELATED APPLICATIONS

This application is a continuation of U.S. application Ser. No. 14/744,697, filed on Jun. 19, 2015 and entitled "Aggregation of Rating Indicators," which claims priority to U.S. Provisional Application Ser. No. 62/015,503, filed on Jun. 22, 2014 and entitled "Methods and Systems for Rating Aggregation," the complete disclosures of which, in their entireties, are hereby incorporated by reference.

BACKGROUND

Technical Field

The embodiments herein generally relate to data compilation, and more particularly to methods and systems for aggregating ratings data.

Description of the Related Art

Different review platforms often provide different ratings and reviews which may be substantially different based on who is providing the review and based on reliability and authenticity associated with reviewers and reviews. Such platforms leverage the wisdom of a crowd for assessing different entities such as physicians etc. Rating aggregation algorithms exist which typically collate different ratings from such as websites and generate a summation or an average rating for an entity which is indicative of credibility of the entity such as a physician.

Existing methods and systems however do not generally provide an optimal aggregate score since the ratings may be influenced due to variances in reviewers' approach of rating an entity and because all reviews or reviewers may not be reliable in the same way.

In view of the above, there is a need to provide an improved way and system for generating an aggregate rating indicator about an entity to establish an optimal rating and to facilitate searching of entities in an optimal way based on rating indicators to meet user requirements in a precise manner.

SUMMARY

An embodiment herein provides a computer-implemented method for publishing an aggregate rating indicator based on a plurality of discrete rating indicators associated with a rated entity. The method includes searching a plurality of repositories containing the plurality of discrete rating indicators associated with the rated entity, wherein each of the plurality of rating indicators comprises a numerical score component and a sentiment score component. The method may include retrieving a first rating indicator published on a web-based repository. The first rating indicator may include a first numerical score component and a first semantic score component. The method may include retrieving a second rating indicator published on a personalized social networking platform section. The second rating indicator may include a second numeric score component and a second semantic score component. The method may include retrieving a third rating indicator stored with a local storage component associated with the rated entity or a rating entity. The third rating indicator may include a third numeric score component and a third semantic score component. At least one of the first rating indicator, the second rating indicator, and the third rating indicator may be a fraudulent rating indicator. The method may include storing the first rating indicator, the second rating indicator, and the third rating indicator in a memory circuit equipped with a special purpose processor. The method may include filtering out the fraudulent rating indicator from among the first rating indicator, the second rating indicator, and the third rating indicator, by the special purpose processor, wherein the fraudulent rating indicator is determined by the special purpose processor based on a combination of parameters including a geo-location coordinate similarity between a rating entity and the rated entity, gender identification, age specifics, frequency of the rating indicator of the rated entity by the rating entity, sentiment writing style, duration between the rating indicator and a subsequent rating indicator by the same rating entity for the same rated entity, duplicate rating indicators provided by the rating entity for the rated entity, use of multiple different rating sources for rating the rated entity by the rating entity, and the like. The method may include aggregating the first rating indicator, the second rating indicator, and the third rating indicator by the special purpose computer after filtering out the fraudulent rating indicator such that the aggregation results in an aggregate rating indicator indicative of an equivalent of the plurality of discrete rating indicators other than the fraudulent rating indicator. The method may include generating an electric signal comprising data signifying the aggregate rating indicator and the rated entity. The method may include transmitting the electric signal from a data communication device, communicatively connected with the special purpose processor, in a network comprising a plurality of communicatively linked data communication devices. The method may include converting the electric signal into a plurality of pixels. The method may include displaying the plurality of pixels on a display unit of a second communication device to publish the aggregate rating indicator associated with the rated entity and the data signifying the rated entity.

An embodiment herein provides a system for publishing an aggregate rating indicator based on a plurality of discrete rating indicators associated with a rated entity. The system may include a search engine for searching a plurality of repositories containing the plurality of discrete rating indicators associated with the entity, wherein each of the plurality of rating indicators comprises a numerical score component and a sentiment score component. The system may include a special purpose processor for retrieving a first rating indicator published on a web-based repository. The first rating indicator includes a first numerical score component and a first sentiment score component. The special purpose processor is configured to retrieve a second rating indicator published on a personalized social networking platform section. The second rating indicator includes a second numeric score component and a second sentiment score component. The special purpose processor is configured to retrieve a third rating indicator published with a local storage component associated with the rated entity or a ratting entity. The third rating indicator includes a third numeric score component and a third sentiment score component, wherein at least one of the first rating indicator, the second rating indicator, and the third rating indicator is a fraudulent rating indicator. The system includes a memory circuit communicatively and operatively connected with the special purpose processor for storing the first rating indicator, the second rating indicator, and the third rating indicator. The system includes a rating filter or a filtering engine communicatively coupled with the special purpose processor and the memory circuit for filtering out a fraudulent rating indicator. The fraudulent rating indicator is determined based on a combination of parameters including a geo-location coordinate similarity between a rating entity and the rated entity, gender identification, age specifics, frequency of the rating indicator of the rated entity by the rating entity, sentiment writing style, duration between the rating indicator and a subsequent rating indicator by the same rating entity for the same rated entity, duplicate rating indicators provided by the rating entity for the rated entity, use of multiple rating sources for rating the rated entity by the rating entity. The system may include a rating aggregator communicatively and operatively connected with the special purpose processor for aggregating the first rating indicator, the second rating indicator, and the third rating indicator after filtering out the fraudulent rating indicator such that the aggregation results in an aggregate rating indicator indicative of an equivalent of the plurality of discrete rating indicators other than the fraudulent rating indicator. The system includes an electric signal generator embedded in an electronic circuit and communicatively and operatively connected with the special purpose processor and the memory circuit for generating an electric signal comprising data signifying the aggregate rating indicator and the rated entity. The system includes a transceiver for transmitting the electric signal from a data communication device, communicatively connected with the special purpose processor and the electric signal generator, in a network comprising a plurality of communicatively linked data communication devices. The system includes a signal converter for converting the electric signal into a plurality of pixels to publish the aggregate rating indicator associated with the rated entity and the data signifying the rated entity.

BRIEF DESCRIPTION OF THE DRAWINGS

In the drawings, like numerals describe similar components substantially throughout the several views. The drawings illustrate generally, by way of an example, but not by a way of limitation, various embodiments.

FIGS. 8A and 8B illustrate examples of financial information and profile information retrieved by a rating aggregator for use in comparative determination of associated aggregated ratings of physicians in accordance with an embodiment herein;

DETAILED DESCRIPTION

In the following detailed description, reference is made to the accompanying drawings that form a part hereof, and these are shown by way of illustrating specific embodiments herein that may be practiced. These embodiments, which are also referred to herein as "examples," are described in sufficient detail to enable those skilled in the art to practice the embodiments herein, and it is to be understood that the embodiments may be combined, or that other embodiments may be utilized and that structural, logical, and electrical changes may be made without departing from the scope of the embodiments herein.

In this document, the terms "a" or "an" are used, as is common in patent documents, to include one or more than one. In this document, the term "or" is used to refer to a "nonexclusive or" unless otherwise indicated.

Figure 1:
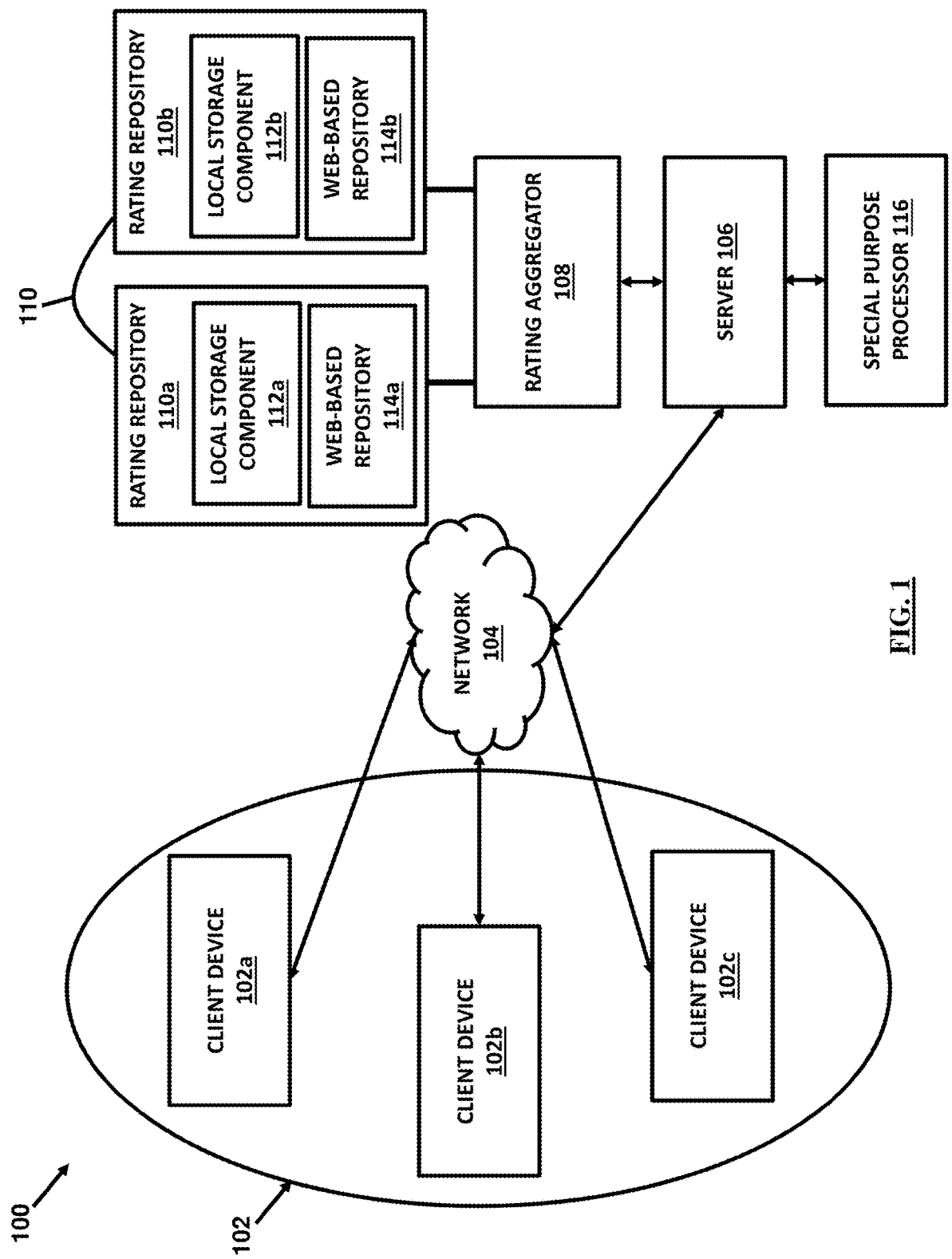
FIG. 1 illustrates an exemplary architecture for establishing ratings in accordance with an embodiment herein.

FIG. 1 illustrates an exemplary architecture 100 for establishing rating indicators in accordance with an embodiment herein. As depicted, the architecture 100 may include a plurality of client devices 102a, 102b, and 102c together referred to as 102 that are networked through a network 104 with a server 106. The server 106 acts as a central system for allowing access of the plurality of client devices 102 to a rating aggregator 108. The rating aggregator 108 is communicatively connected with the server 106.

The plurality of client devices 102 may include devices such as a user computer or any other computing device that includes input devices (such as a keyboard, mouse, microphone) and output devices (such as a monitor, printer, or speaker). The user computer may also include network connections to other devices, computers, networks, servers, etc., that are connected to the network 104. In some embodiments, the network 104 is a local area network (LAN), a wide area network (WAN), an intranet or extranet, or a combination thereof. Communications with the network 104 are implemented using wired and/or wireless technologies. Other configurations may be possible.

The client devices 102 are associated with users such as individuals or institutions and the like. In some examples, the users may want to know review scores or ratings about other persons or groups or institutions such as but not to limited to doctors, physicians, hospitals, other healthcare providers, other service providers or other types of professionals, or group of professionals or institutes etc.

The client devices 102 communicate with the rating aggregator 108 through the network 104. In some embodiments, the rating aggregator 108 may include a search engine that crawls the Internet and downloads and analyzes rating sites along with the rating indicators found on the Internet. The rating aggregator 108 allows the users associated with the client devices 102 to submit a query in the form of search terms such as keywords or a phrase in Boolean expression or natural language to the search indexes in an attempt to locate desired information related to aggregated rating indicators about an entity such as but not limited to doctors, physicians, hospitals, other healthcare providers, other service providers or other types of professionals, or group of professionals or institutes etc. The rating aggregator 108 is further discussed below.

The rating aggregator 108 may be communicatively coupled with a plurality of rating repositories 110 such as 110a and 110b that may include such as local storage components 112a and 112b and web-based repositories 114a and 114b. The rating aggregator 108 may extract rating indicators from the plurality of rating repositories 110 and perform aggregation as discussed later in conjunction with various figures.

Figure 2:
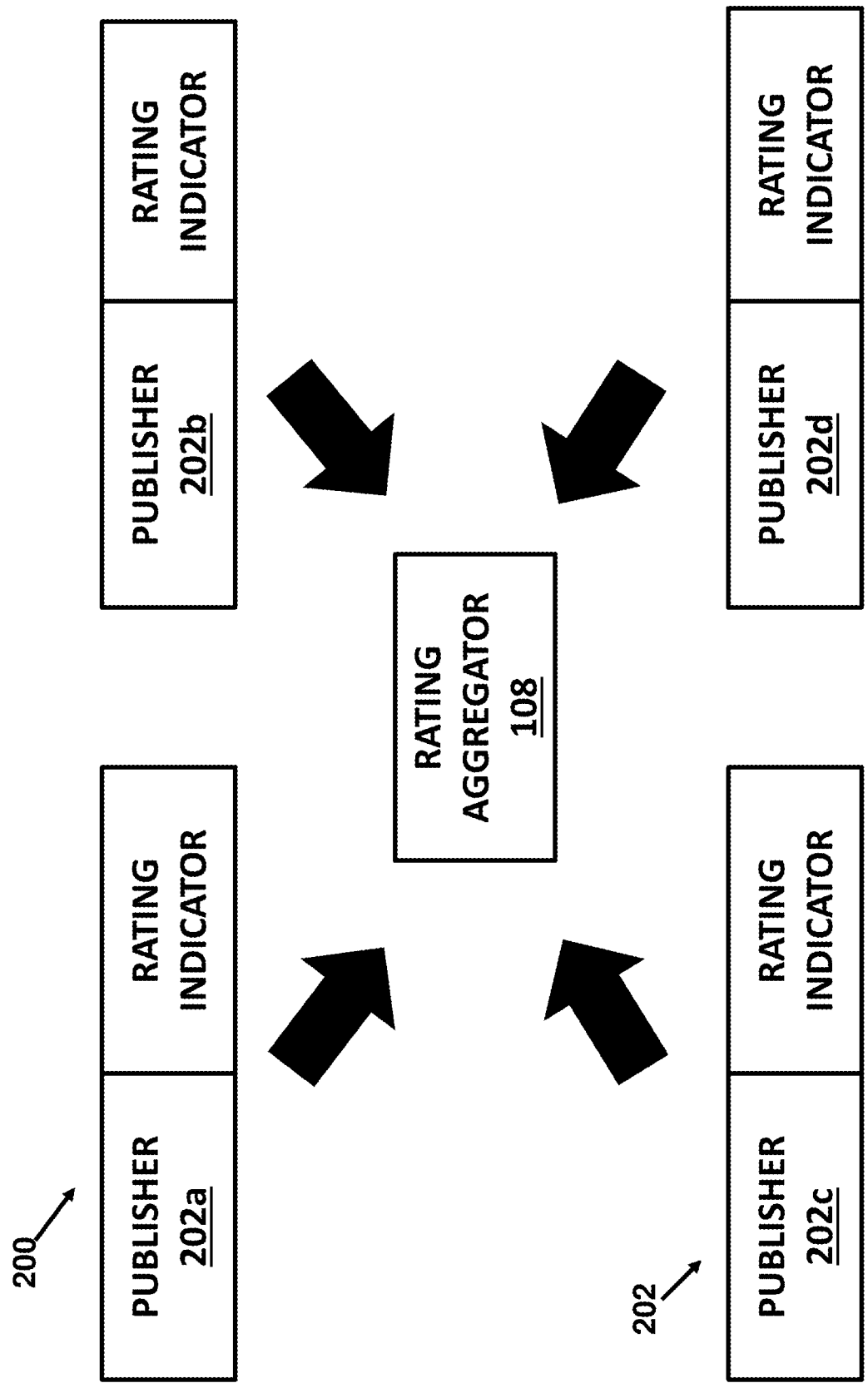
FIG. 2 illustrates an exemplary environment depicting a process of aggregation of ratings acquired from a plurality of publishers in accordance with an embodiment herein.

FIG. 2, with reference to FIG. 1, illustrates an exemplary environment 200 depicting a process of aggregation of the rating indicators acquired from a plurality of publishers 202a, 202b, 202c, and 202d together referred to as 202. The publishers 202 may each be associated with a respective rating repository similar to the rating repositories 110a and 110b. In accordance with various embodiments, the publishers 202 may include items such as a website, a social networking page, a software platform interconnected through the network 104, or any other forum that publishes a rating indicator associated with a rated entity such as but not limited to doctors, physicians, hospitals, other healthcare providers, other service providers or other types of professionals, or group of professionals or institutes etc. For example, the publishers 202 can be a web site that provides information about products, services, or other areas of interest. In some embodiments, the publishers 202 may provide one or more web sites on a given topic.

The publishers 202 are communicatively connected with the rating aggregator 108 through a communication mechanism such as a network similar to the network 104 discussed in conjunction with FIG. 1. The rating aggregator 108 may facilitate aggregation of the individual rating indicators taken from the publishers 202 and apply rules to determine a cumulative or aggregated rating indicator. The aggregated rating indicator may be determined by the rating aggregator 108 by using one or more of various algorithms or methods including without limitations such as simple averaging, weighted averaging, summation, mean, and the like and various other ways as discussed elsewhere in the document. In accordance with various embodiments herein, the aggregated rating indicator as determined by the rating aggregator 108 may be filtered for superfluous, erroneous, or fraudulent ratings or effects as further discussed below. The final or aggregated rating indicator obtained by the rating aggregator 108 may be published by the rating aggregator 108 on a separate website or with a website associated with any of the publishers 202. The aggregated final rating indicator or the aggregated rating indicator may be differentiated from the individual rating indicators and a comparison may be provided along with publishing of the aggregated rating indicator on the website.

Figure 3:
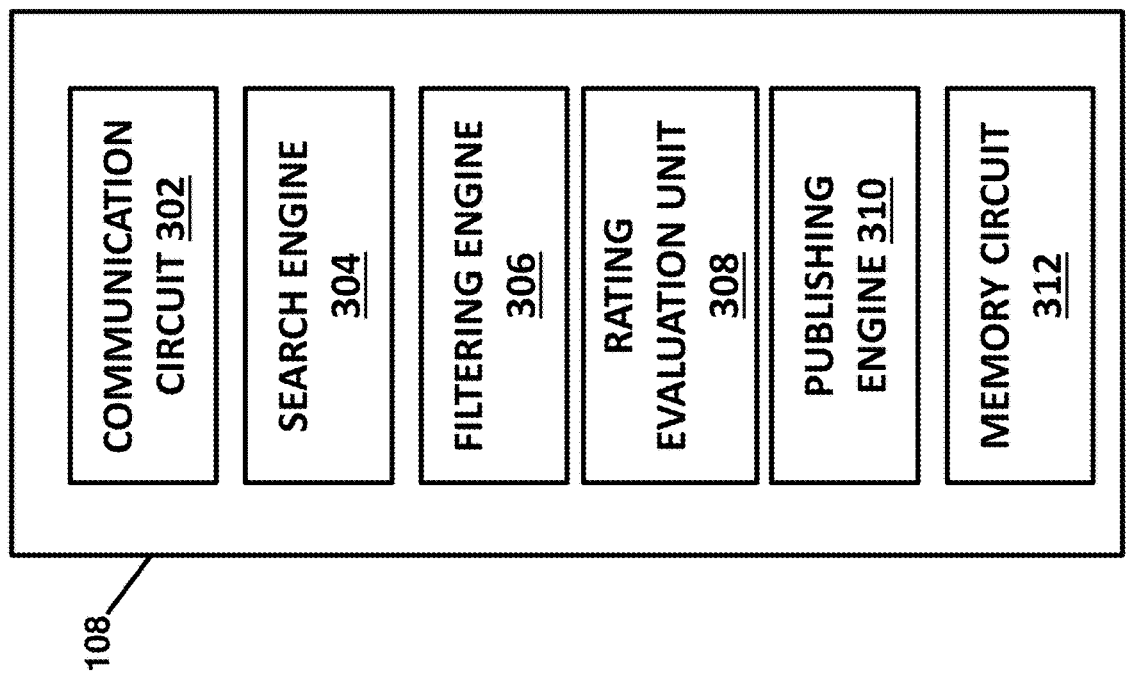
FIG. 3 illustrates a system block diagram of the rating aggregator in accordance with an embodiment herein.

FIG. 3, with reference to FIGS. 1 and 2, illustrates a system block diagram of the rating aggregator 108 in accordance with an embodiment herein. The rating aggregator 108 includes a communication circuit 302, a search engine 304, a filtering engine 306, a rating evaluation unit 308, a publishing engine 310, and a memory circuit 312. In an embodiment, the rating aggregator 108 may be connected communicatively with the server 106 as shown in FIG. 1.

The search engine 304 may be configured to run a search query for identification of websites that post rating indicators for specific products or services. The search engine 304 crawls the Internet and downloads and analyzes sites found on the Internet that contain any type of reviews or ratings associated with a particular category. In an example, the search engine 304 may be operatively connected with a search server (not shown) that may include one or more programs for providing searching capabilities and search results processing capabilities. In an example, the search server can include one or more programs that are downloaded and installed to allow the search engine 304 to discover and act on information. In an example, the search engine 304 may download the program using a known protocol such as HTTP or the file transfer protocol (FTP). Once downloaded, the programs are run by the search engine 304 in connection with the search server.

The program allows the search engine 304 to perform discrete searches using multiple sources of information that contain reviews and rating indicators. These discrete search capabilities can be coupled with other traditional sources, such as Google™ and Yahoo!™ search engines, for example, to enhance the search experience by the search engine 304 and to make sure that the rating indicators and review searches are comprehensively performed throughout the Internet-based information sources. In an example, the search engine 304 may be hosted locally with other components of the rating aggregator 108. In other embodiments, the search engine 304 may be hosted remotely such as by a remote server (e.g., server 106 or some other server (not shown)). In such embodiments, the remote server may be linked with individual servers of persons or institutes so as individuals to search for rating indicators and review and submit such rating indicators through a social platform or a user interface to the rating aggregator 108. In this manner, distributed individual search experiences and search outputs may be merged along with search capabilities of the search engine 304 providing enhanced and comprehensive review and rating aggregation experience to users and viewers of the aggregated rating indicators.

In an example, the search engine 304 may further include or be communicatively coupled to a browsing engine (not shown). The browsing engine may be communicatively connected with individual users or viewers or members who are subscribed with a platform provided by the rating aggregator 108 or a service provider who maintains the rating aggregator 108 through a website, social networking site, rating aggregator platform or through any cloud or non-cloud-based distributed architecture. The browsing engine may be programmed to search the individual's own data storage devices to index the individual's own content so as to explore their views and reviews and rating indicators and merge them with the individual rating indicators during aggregation. These explored reviews and rating indicators are identified for any erroneous and superfluous or fraudulent content or reviews prior to aggregation. The filtering of the rating indicators is discussed below.

In an embodiment herein, the various individual rating indicators identified by the search engine 304 are defined in association with the product category they belong to or even a particular object or product or person or institute. For example, the rating indicators may belong to a particular category such as football game review by US citizens. In another aspect, the individual rating indicators may belong to and may be associated with a particular object or product or person or institute for example reviews or rating indicators about a particular physician. In an embodiment, the rating indicators may be numeric in nature. In an embodiment, the rating indicators may be subjective in nature defined in the form of textual, audio, or visual reviews or in the form of a combination of these wherein a sentiment analysis may be needed as will be discussed below.

The filtering engine 306 is configured to filter out the superfluous, erroneous, or fraudulent rating indicators (hereinafter referred to as erroneous rating indicators together interchangeably for the purpose of simplicity of description) from a set of identified individual or discrete rating indicators as identified by the search engine 304. In an embodiment, the filtering engine 306 may be configured to filter the individual rating indicators based on frequency of rating of an entity by a person. For example, if a person provides a rating to an entity too frequently, the rating indicator may be considered as erroneous and not trustworthy. In such a case, the trust and reliability associated with the rating indicator may be considered as low. On the contrary, if the frequency of rating of an entity by a person is moderate or low, it may be considered as trustworthy and reliable. Such a rating indicator may not be considered as erroneous.

In an aspect of the embodiments herein, the filtering engine 306 may be configured to filter the individual rating indicators based on quantity of rating of a rated entity by a rating entity. For example, if the same person (or rating entity) rates the same rated entity multiple times from different websites or from different publishers, the rating indicator may be considered as erroneous. In such as case, the filtering engine 306 may either remove the redundant rating indicator or may altogether consider the rating indicator as erroneous. For example, in one case, if the same rating entity rates the same rated entity twenty times from twenty different websites, the filtering engine 306 may consider these twenty rating indicators equal to only one rating indicator and the remaining nineteen rating indicators may be considered as erroneous and filtered out during aggregation. In another case, the rating indicator by such a rating entity may altogether be considered as not trustworthy and unreliable and such rating indicators by any such person are completely moved out of the aggregation process by the filtering engine 306 and are not considered at all. In some embodiments, trust and reliability indices may be associated with individual rating indicators such that aggregated rating indicators with at least a defined threshold level of indices only are considered for aggregation.

In an aspect of the embodiments herein, the filtering engine 306 may be configured to filter the individual rating indicator based on spatial coordinates such as geographical locations. For example, if a person based in Texas, USA rates a physician located in the UK, the associated rating indicator may be considered as erroneous. In an aspect of the embodiments herein, the filtering engine 306 may be configured to filter the individual rating indicators based on gender identification. For example, if a male person rates a gynecologist, it may be considered as fraudulent or erroneous and may be filtered out during the rating aggregation process. In an aspect of the embodiments herein, the filtering engine 306 may be configured to filter the individual rating indicators based on age specific information associated with the rating entity who rates the rated entity.

The rating evaluation unit 308 may be configured to process the individual rating indicators obtained after filtering out of the superfluous and erroneous rating indicators. In an aspect, the processing may involve performing a simple averaging or weighted averaging of the individual rating indicators. In an aspect, the processing may involve summation of the individual rating indicators. In still another aspect, the processing may involve calculating mean of the individual rating indicators. In an aspect, the processing may involve various other algorithms or statistical and analytical tools such as calculating standard deviation etc. for the individual rating indicators. The processing of the individual rating indicators by the rating evaluation unit 308 results in an evaluated or aggregated rating indicator that is a representation of the individual rating indicators taken together without any erroneous effect caused due to erroneous and superfluous rating indicators.

The rating evaluation unit 308 further associates a comparative rank to various aggregated rating indicators in a defined category of rated entities. For example, after determining the aggregated rating indicators for a group of physicians in California, USA, the rating evaluation unit 308 may further associate a comparative rank with each of the aggregated rating indicators corresponding to rated entities that are indicative of which physician or rated entity is rated higher or lower relatively in the defined category.

The publishing engine 310 may be configured to receive the aggregated rating indicator and/or the relative rank of the rated entity within the category of ratings and publish the rating indicator on a website or any other portal such as associated with any of the publishers 202 or any other publisher. In an aspect of the embodiments herein, the aggregated rating indicator may be published on a social networking website. In an aspect of the embodiments herein, the aggregated rating indicator may be published by any other review website. In another aspect of the embodiments herein, the rating aggregator 108 may be communicatively linked with one or more of the publishers 202 to depict the aggregated rating indicator along with the individual ratings as published by the publishers 202 on the same page so as viewers to compare a local individual rating indicator on a website and a corresponding aggregated rating indicator. In an aspect of the embodiments herein, the server 106, operatively connected to the rating aggregator 106, may separately host a website on its own to publish the aggregated rating indicator independently.

In accordance with various embodiments herein, various ways of depicting or publishing the aggregated rating indicator may be employed by the publishing engine 310. For example, in an aspect of the embodiments herein, a visual or a graphical interface displaying the aggregated rating indicator may be provided. For example, a custom chart such as a bar chart and the like may be used to display the aggregated rating indicator.

In an aspect of the embodiments herein, the publishing engine 310 may display a user interface sectioned into two separate portions. Individual rating indicators may be displayed on one side of the interface in one portion while a respective aggregated rating indicator is displayed in another portion of the section or interface. For example, on a right side of the interface, there may be thirty rating indicators taken from individual websites while a right side of the interface may include only one rating indicator that is an aggregated rating indicator corresponding to the thirty individual rating indicators.

In an aspect of the embodiments herein, the aggregated ratings may be defined in the form of positive or negative ratings. In an aspect of the embodiments herein, the aggregated ratings and the individual ratings may simultaneously be displayed on a user interface such as in the form of numerator and denominator combinations, and the like. In accordance with other embodiments, several other types of depictions, displays, and visuals may be used to publish the aggregated ratings. The published aggregated ratings may be linked to a customizable user interface (not shown) that can be customized by a user or viewer of a page or website containing the published aggregated ratings.

The memory circuit 312 may be communicatively connected with the search engine 304 to store the individual rating indicators gathered by the search engine 304. The memory circuit 312 may be further connected communicatively with the filtering engine 306 to store details about the erroneous rating indicators that are filtered out. The memory circuit 312 may be further connected with the rating evaluation unit 308 to store details about the aggregated rating indicator. In an embodiment herein, the memory circuit 312 may store the aggregated rating indicator in association with details about a category to which it belongs to such as for example, physicians, movies, actors, and the like.

In accordance with an embodiment herein, the rating aggregator 108 may include the communication circuit 302. The communication circuit 302 may, for example, notify a person or any other rated entity who is rated by others such as rating entities prior to aggregation of respective individual rating indicators so as to confirm if the individual rating indicators are appropriate. The communication circuit 302 may also send details about such person who rates the rated entity. The confirmation from the person can be received by the communication circuit 302 which may be indicative of a negative response or a positive response such that a negative response represents that the rated entity does not recognize the rating person who rates him and there is a lesser chance that the rating is appropriate. In an aspect of the embodiments herein, such a rating may be considered erroneous which may be filtered out by the filtering engine 306. The communication circuit 302 may further serve as a communication channel between various other components of the rating aggregator 108 and other external sources such as an entity who is rated (rated entity), persons or groups who rate an entity (rating entity), and other interested parties who are interested in knowing reviews and comments offered to such entities, etc. In an embodiment herein, the communication circuit 302 may be coupled to the user interface that is finally viewed by viewers or users and may provide an interactive platform for information exchange among the users or viewers and the rating aggregator 108 through the user interface.

In an example, the embodiments herein provide a mechanism wherein rated entities for whom aggregated rating indicators are generated may be compared with one another automatically based on their respective aggregated rating indicators. For example, in a group of physicians, it may be identified as to who is the best physician and so on by comparing the respective aggregated rating indicators.

The embodiments herein provide a mechanism wherein similar rated entities may be identified based on their aggregated rating indicators within defined constraints. The defined constraints may, for example, comprise age, geographical location, gender, specialty, and the like. For example, in an aspect of the embodiments herein, similar doctors may be identified in a geographical area based on aggregated scores of doctors in the geographical area. In such a case, if a doctor is busy and cannot take a patient, one can search for another doctor by similarity in specialty or other constraint based on their aggregated rating indicators. In an aspect, the embodiments herein may allow associating similarity indices for a group of rated entities who are considered for rating aggregation.

Figure 4:
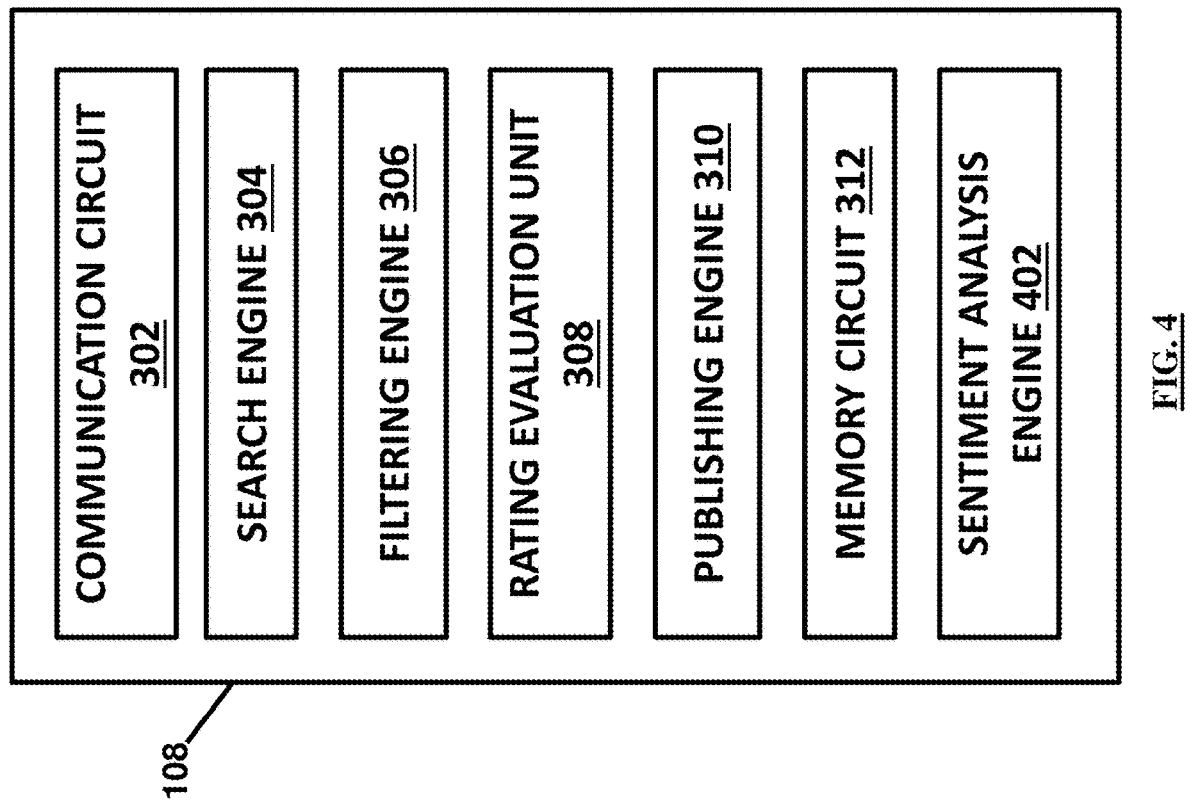
FIG. 4 illustrates an example of a rating aggregator in accordance with another embodiment herein.

FIG. 4, with reference to FIGS. 1 through 3, illustrates an example of the rating aggregator 108, in accordance with an embodiment herein. As shown, the rating aggregator 108 includes all of the components as shown in FIG. 3. The rating aggregator 108 further includes a sentiment analysis engine 402 in addition to the components already discussed in conjunction with FIG. 3.

The sentiment analysis engine 402 is configured to perform a set of analytical operations for analysis of opinions, textual information, sentiments and emotions, and other expressions. The analysis may involve identification of orientation of views, reviews and ratings from textual information containing emotions, or sentiments as indicators of reviews and ratings. In an aspect of the embodiments herein, the sentiment analysis engine 402 converts such subjective expressions and reviews into ratings for use by the filtering engine 306 and rating evaluation unit 308 to determine an aggregate rating indicator. In accordance with the embodiments herein, the sentiment analysis engine 402 facilitates in providing a capability for associating rating indicators with textual information and subjective expressions and further analysis of these rating indicators. In an aspect of the embodiments herein, prior to sentiment analysis by the sentiment analysis engine 402, the views may be either converted into numerical scores or ratings or in the form of negative, positive, or neutral ratings by the sentiment analysis engine 402. For example, a patient may post subjective reviews about a physician on a website. These subjective reviews are analyzed by the sentiment analysis engine 402 to associate a rating indicator with the physician based on the patient judgment. Based on the analysis, the rating indicator is associated by the sentiment analysis engine 402 such that it is indicative of a score of the physician earned from the patient judgment and review. The rating indicator is then used by the filtering engine 306 to perform the filtering tasks as discussed above after which the erroneous rating indicator is moved out of consideration by the rating evaluation unit 308 while calculating an aggregated rating for the physician.

Figure 5:
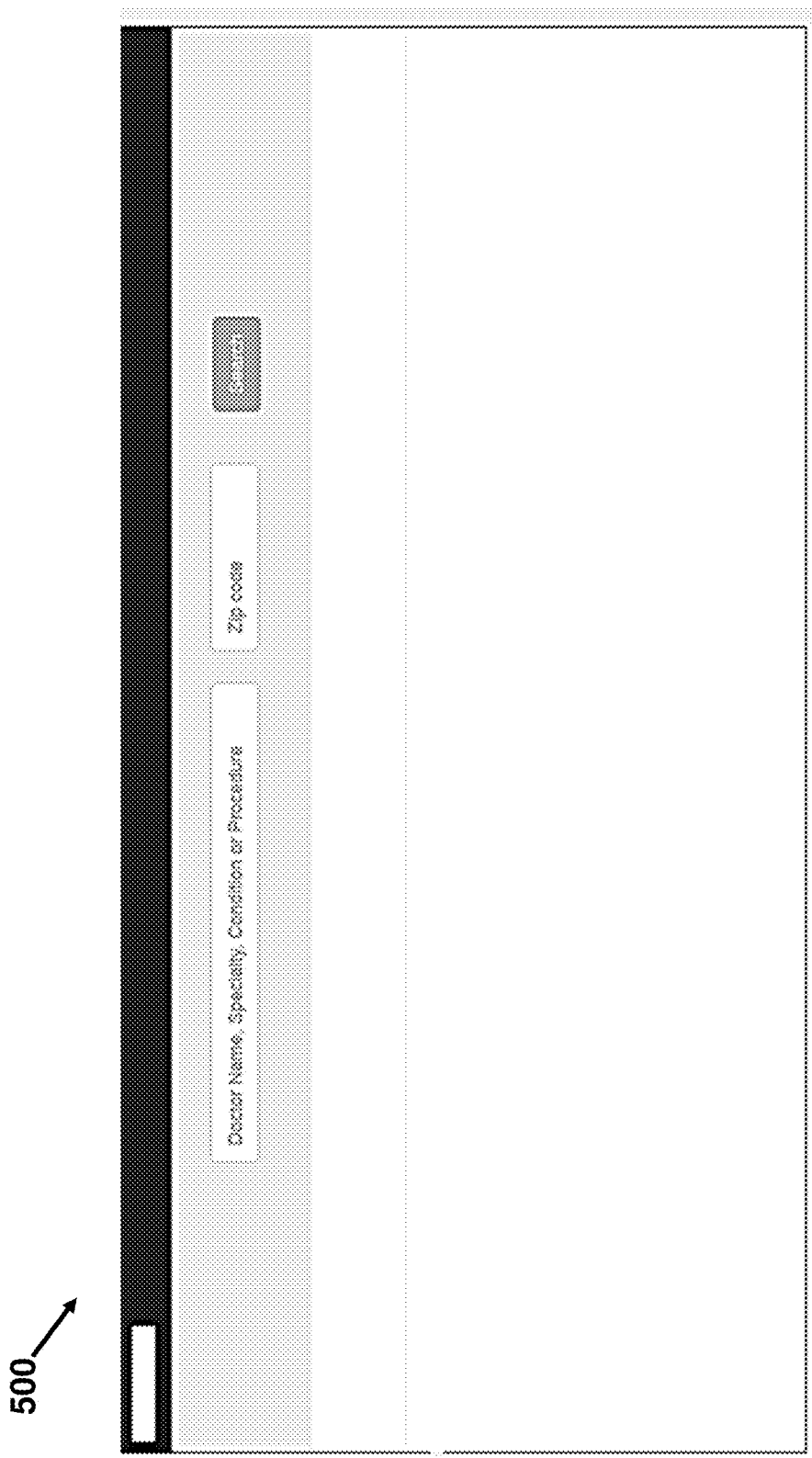
FIGS. 5-7 illustrate examples of user interfaces for facilitating interactions with a rating aggregator in accordance with an embodiment herein.
Figure 6:
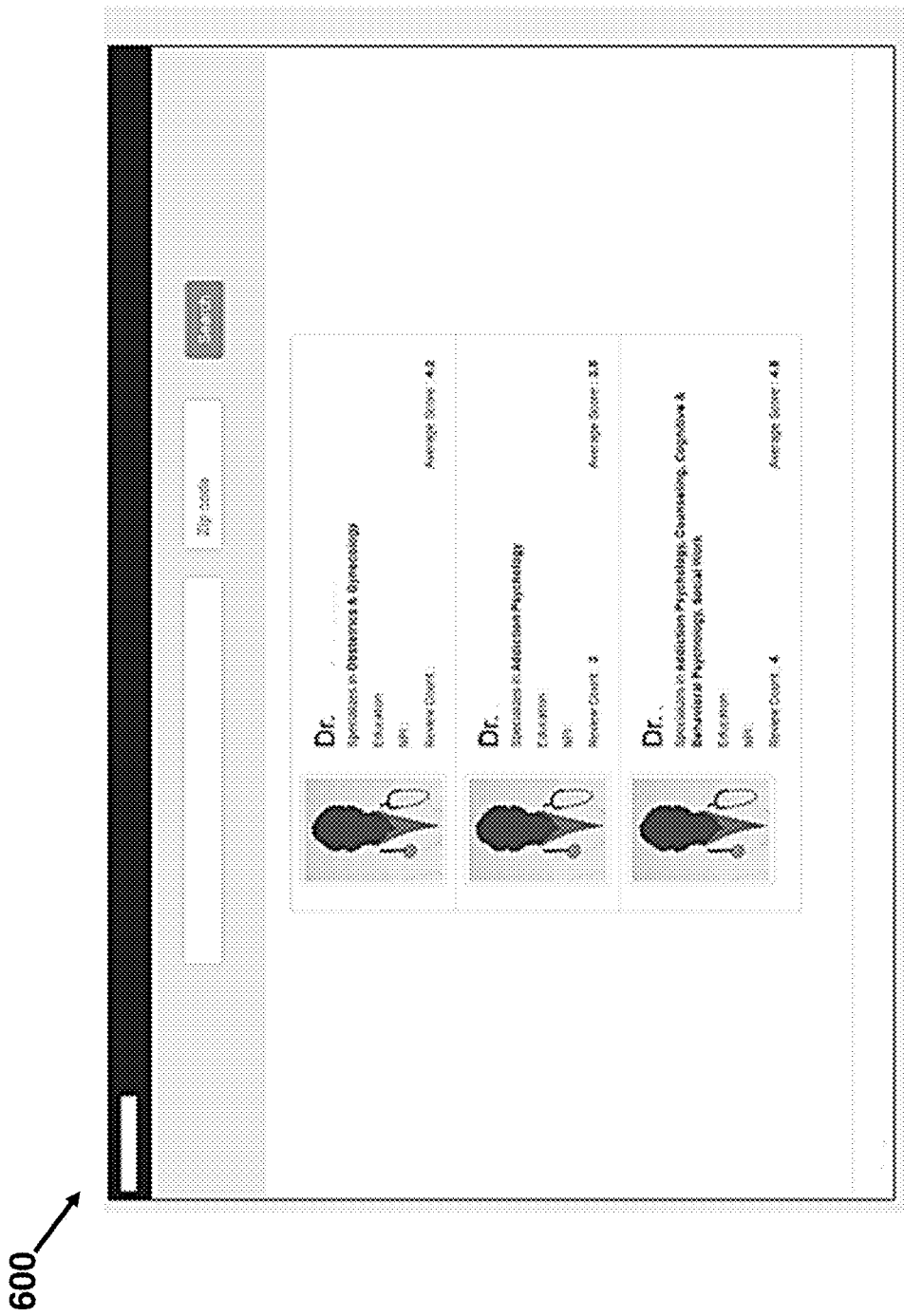
Figure 7:
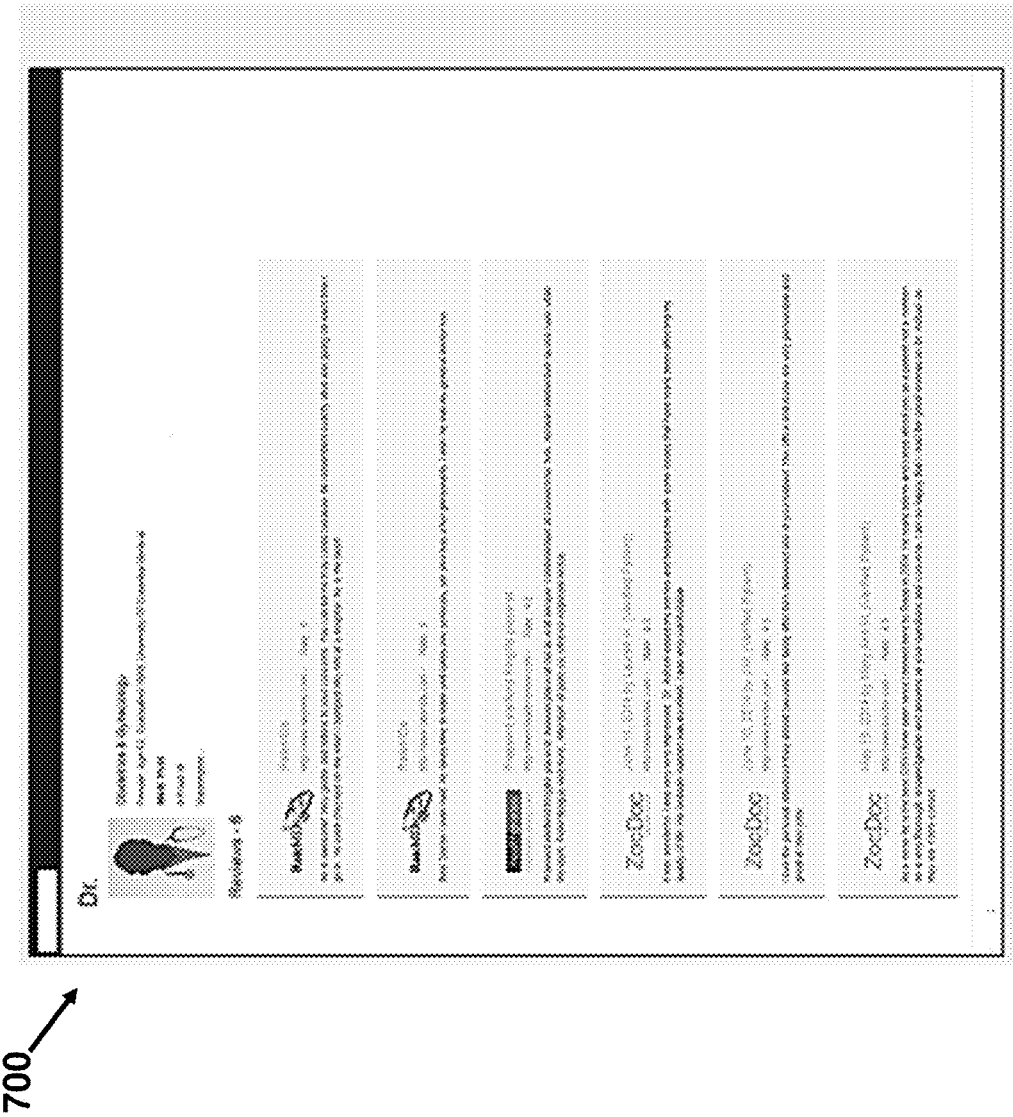

FIG. 5 through FIG. 7, with reference to FIGS. 1 through 4, are examples of user interfaces 500, 600, 700, respectively, of the rating aggregator 108, in accordance with some embodiments herein. The user interfaces 500, 600, 700 provide a mechanism for users to interact with the rating aggregator 108 for rating or review interactions.

Several embodiments are further described below.

In an embodiment herein, a genuineness score may be attached to the aggregated rating indicator or individual rating indicator and also to the rated entity who provides an individual rating indicator. The genuineness score may be calculated by analyzing one or more attributes of the review and the aggregated rating indicator and the rated entity. Some of the parameters or attributes that may be considered for calculating the genuineness score may include, without limitations, the number of reviews, locations, gender, verification of a patient, individual review source site, writing style, and duration of time within which reviews and individual ratings are performed, etc.

In an embodiment herein, a review site that provides reviews or ratings from authenticated users may rank higher than a review site that allows anonymous reviews and ratings. In an embodiment herein, a set of user interfaces may be provided for mobile applications that may allow interactions of a user with the rating aggregator 108 through a mobile device (not shown). In an example, the set of user interfaces may be executed through widgets on the mobile device. In an embodiment herein, the rating aggregator 108 allows taking of a physician's name, and looking up the information on all defined physician ratings and review sites, presenting a combined output that puts together the individual; ratings, comments, reviews, etc. from the various sites and collate them in a single page that may include the aggregated rating indicator.

In an embodiment herein, the rating aggregator 108 may raise flags that are indicative of frauds by specific physicians. In an embodiment herein, the rating aggregator 108 may raise flags that are indicative of conflicts between a physician and a third party. In an embodiment herein, the rating aggregator 108 may be integrated within a healthcare service provider setup so as to integrate reviews and ratings for physicians by filtering out superfluous ratings thereby facilitating in presenting credentialed or authenticated or aggregated rating indicators to users or patients or other rated entities.

In accordance with an embodiment herein, the rating aggregator 108 may be communicatively coupled with external systems (not shown) associated with insurance agencies or other third parties so as to retrieve financial information. The rating aggregator 108 may further be communicatively coupled to rating sites or individual profiles including social profiles associated with social networking services or social networking systems so as to retrieve doctors' or physicians' profile information. The financial information retrieved from the insurance agencies and the profile information may together be integrated so as to generate a comparative structure of physicians performing various procedures and their respective billings to the insurance agencies. An output generated by the comparative analysis yields yet another parameter referred to as financials parameter to be considered during aggregation by the rating aggregator 108 for associating a comparative aggregated rating with a physician. Referring to FIGS. 8A and 8B now, with reference to FIGS. 1 through 7, two diagrams 801, 802 are depicted corresponding to two doctors. As evident, the second doctor (Dr. Mike) performs more procedures and therefore total billings to the insurance agency (in this case Medicare) would be more in case of the second doctor as compared to the first doctor (Dr. Al). Further, the second doctor performs even more types of procedures. The second doctor sees more patients than the first doctor. The output of the comparative analysis of the information such as the one shown in the FIGS. 8A and 8B that is retrieved by the rating aggregator 108 from the insurance agency and the profiles of the physicians or doctors may be used as one of several parameters considered by the rating aggregator 108 for evaluating aggregated rating indicators of each of the two doctors.

Figure 9:
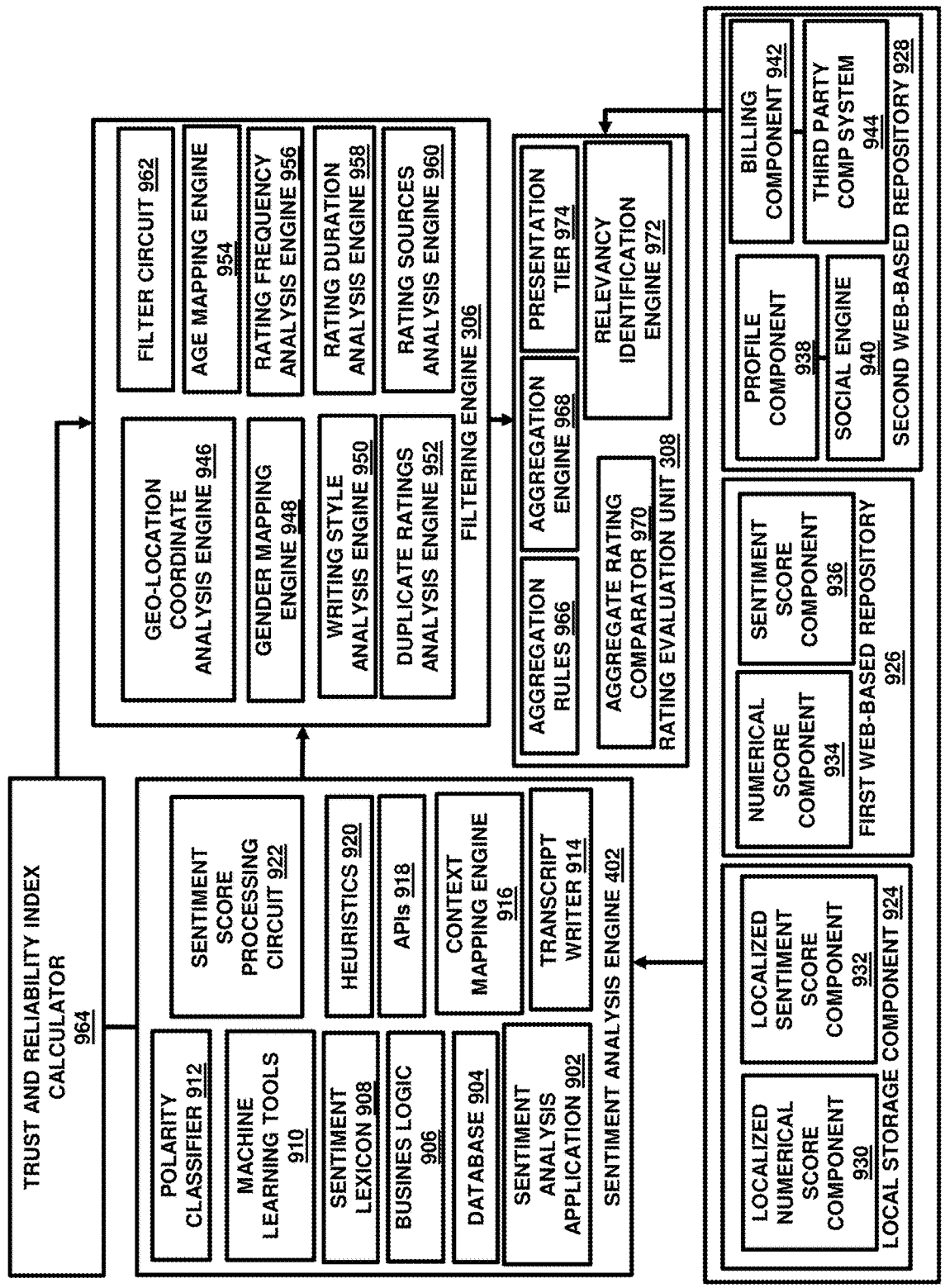
FIG. 9 illustrates a sentiment analysis engine, a filtering engine, and a rating evaluation unit communicatively connected with a plurality of rating sources, in accordance with an embodiment herein.

FIG. 9, with reference to FIGS. 1 through 8B, illustrates an example of the sentiment analysis engine 402, rating evaluation unit 308 and the filtering engine 306 communicatively or operatively coupled with one another to perform various rating aggregation tasks. As depicted, the sentiment analysis engine 402 may include a sentiment analysis application 902, a database 904, business logic 906, a sentiment lexicon 908, machine learning tools 910, a polarity classifier 912, a transcript writer 914, a context mapping engine 916, APIs 918, heuristics 920, and a sentiment score processing circuit 922.

The sentiment analysis application 902 may be configured to execute sentiment processing tasks with the use of specific software and hardware combinations so that the sentiment analysis application 902 may be initiated to execute a set of tasks for analyzing sentiment-based ratings including reviews, comments, and the like that are indicative of ratings provided by the rating entity for the rated entity. The sentiment analysis application 902 may be configured to read expressions and emoticons and various other types of sentiments. The sentiment analysis application 902 may be run by an application specific processing component or processor configured to perform sentiment analysis of sentiment-based ratings. The sentiment analysis application 902 may utilize a set of other APIs 918 to facilitate execution of specific applications. The database 904 may store defined rules for sentiment analysis. For example, the database 904 may store various emoticons, sentiments or other expression forms that may be used to provide a rating by the rating entity. The sentiment lexicon 908 may further be integrated or communicatively connected with the database 904. The sentiment lexicon 908 may store text-based information or dictionary rules or vocabulary that may be used by the rating entity for providing a sentiment-based rating involving use of specific words or text or phrases which may be stored by the sentiment lexicon 908. The sentiment lexicon 908 and the database 904 may together store information pertinent to expressions or vocabulary etc. which may be compared with the words, expressions, etc. occurring in the sentiment score component of the rating indicator to perform sentiment analysis of the sentiment score component of the rating indicator.

The sentiment analysis application 902 may utilize information contained in the database 904, sentiment lexicon 908, and the business logic 906, and may apply heuristics 920 and the machine learning tools to perform the analysis of the sentiment score component. The sentiment analysis application 902 may further retrieve polarity indices or polarity identifiers indicative of positive and negative polarities or expressions generated and classified by the polarity classifier 912. The polarity classifier 912 may classify various expressions in either a positive expression or a negative expression to associate a polarity to the sentiment score component such that the classified expressions may be used by the sentiment analysis engine 402 to perform sentiment analysis for polarity related expressions. The sentiment analysis application 902 may further associate a context value to the sentiment score component during sentiment analysis of the sentiment score component so that each sentiment score component is analyzed in view of the context in which sentiments are provided by the rating entity for the rated entity in the form of the sentiment score component of the rating indicator. The transcript writer 914 may generate transcripts for audio or video reviews or comments so that the sentiment analysis application 902 may use the transcripts for performing sentiment analysis.

The sentiment score processing circuit 922 may run the sentiment analysis application 902 and determine a score in the form of a numerical value or in any other form such that the score is representative of the sentiment score component. The sentiment processing circuit 922 may therefore, in an embodiment, create a score component that may not be sentiment-based but represents the sentiment score component through values or rating indicators that may be aggregated with the numerical score component through statistical tools after filtering of the erroneous or fraudulent rating indicators.

The sentiment analysis engine 402 may perform analysis on the plurality rating indicators that may include numerical components as well as sentiment score components such that the sentiment score components may be processed by the sentiment analysis engine 402 in a way that the scores determined based on and representative of the sentiment score components may be easily aggregated with the numerical score components to determine aggregate rating indicators. The plurality of rating indicators may be retrieved from various sources such as a local storage component 924, a first web-based repository 926, and a second web-based repository 928.

The local storage component 924 may be associated with a personal storage device of the rating entity such as a personal computer or a personal computing machine such that the sentiment analysis engine 402 may access the local storage component 924 remotely to access a localized numerical score component 930 and a localized sentiment score component 932. The localized numerical score component 930 signifies numerical ratings provided by the rated entity and stored on the local or personal storage device. The localized numerical score component 930 may not be publicly published on a web or any other networked platform accessible by general public for reasons of privacy and to keep the published ratings anonymous, in an example. The localized sentiment score component 932 signifies sentiment-based ratings such as reviews, comments, feedback etc. provided by the rated entity and stored on the local or personal storage device. The localized sentiment score component 932 may not be publicly published on a web or any other networked platform accessible by general public for reasons of privacy and to keep the published ratings anonymous, in an example. The localized numerical score component 930 and the localized sentiment score component 932 may be accessed by the sentiment analysis engine 402 upon authorization by the rated entity such that the sentiment analysis engine 402 may privately access the local storage component 924 to retrieve the localized numerical score component 930 and the localized sentiment score component 932. In an example, the context mapping engine 916 of the sentiment analysis engine 402 may perform the sentiment analysis of the localized sentiment score component 932 based on the localized numerical score component 930 such that the localized numerical score component 930 may influence analysis of the localized sentiment score component 932.

The sentiment analysis engine 402 may access the first web-based repository 926 that may be publicly available through a web-based interface or any other such interface. The first web-based repository 926 may store a numerical score component 934 and a sentiment score component 936. The numerical score component 934 signifies numerical ratings provided by the rated entity and stored on the first web-based repository 926 which may be public. The sentiment score component 936 signifies sentiment-based ratings such as reviews, comments, feedback etc. provided by the rated entity and stored on the first web-based repository 926. The numerical score component 934 and the sentiment score component 936 may be accessed by the sentiment analysis engine 402 for performing sentiment analysis of the sentiment score component 936. In an example, the context mapping engine 916 may perform the sentiment analysis of the sentiment score component 936 based on the numerical score component 934 such that the numerical score component 934 may influence analysis of the sentiment score component 936.

The sentiment analysis engine 402 may access the second web-based repository 928 which may be publicly accessible by a social connection over a social network. The second web-based repository 928 may store a profile component 938 over a social platform hosted by the social network such that the profile component 938 may be accessible by the sentiment analysis engine 402 through a social engine 940 associated with the social networking platform with dynamically changing user connections. The profile component 938 may include a computer executable profile of the rated entity generated by the rating entity and accessible through the social engine 940. The sentiment analysis engine 402 may further access a billing component 942. The billing component 942 may include financial and billing information generated and verified by a third party computing system 944 such that the profile component 938 and the billing component 942 include a combination of sentiments, natural texts, numerical scores, and other numerical data. The aggregation of the plurality of discrete ratings may depend on several factors as discussed elsewhere in the document. In an embodiment, the aggregation may depend on a comparison output obtained from comparison of the profile component 938 and the billing component 942 of the rated entity. A higher weight may be associated during aggregation if the profile component 938 matches with the billing component 942 substantially which may be indicative that the profile of the rated entity is reliable based on ratings provided by the rated entity as well as billing information disclosed to third parties such as tax authorities and the like.

In an example, the social networking platform or the social engine 940 may allow dynamically changing connections wherein the rating entity and the rated entity may be one such dynamic changing connections. The social networking platform or the social engine 940 herein may refer to a socially networked engine or portal allowing access to a crowd of persons or computers as network connections whose identity and profile and social relationships among one another changes dynamically over time. These dynamically changing connections may access the social engine 940 through registered social profiles. The social engine 940 may allow users (who are registered as dynamic connections) to sign up and communicate with their friends, peers, colleagues, coworkers or other individuals they share some common interest with. These connections are made through requests and most commonly must be mutually accepted before certain functionality is allowed between two or more individuals. The connections provide the ability to the users to share content amongst and between them enabled through social networking applications.

In an example, various numerical ratings and numerical score components may be directly submitted to the filtering engine 306 while various sentiment-based ratings or sentiment score components may be submitted to the sentiment analysis engine 402 which may upon sentiment analysis be accessed by the filtering engine 306. The filtering engine 306 may collate the sentiment score components 932 and 936 and the numerical score components 930 and 934 for performing ratings filtering tasks such as to remove erroneous or fraudulent ratings prior to aggregation to determine the aggregate score.

The filtering engine 306 may include a geographical (geo) location coordinate analysis engine 946, a gender mapping engine 948, a writing style analysis engine 950, a duplicate ratings analysis engine 952, age mapping engine 954, a rating frequency analysis engine 956, a rating duration analysis engine 958, and a rating sources analysis engine 960.

In an example, the geo-location coordinate analysis engine 946 may retrieve geo-location coordinate information of the rated entity and the rating entity and compare the two locations. Based on the comparison, the geo-location coordinate analysis engine 946 may identify geographical proximity of the rating entity and the rated entity. A predefined threshold may be defined such that if the geographical proximity is more than the threshold, the rating indicator may be considered erroneous signifying a possibility of fraud because the rating entity is located far from the rated entity and there are fewer chances that the rated entity would have interacted with the rating entity.

In an example, the gender mapping engine 948 may retrieve gender specific information of the rated entity and the rating entity. Based on predefined criteria, the filtering engine 306 may consider a rating indicator as erroneous depending on an output generated by the gender mapping engine 948. For example, if the rated entity is a doctor for gynecology treatments and if the rating entity is a male person, the rating indicator provided by the rating entity may be considered erroneous depending on the predefined criteria.

In an example, the writing style analysis engine 950 may compare writing style of the reviews and the comments written by the rating entity with pre stored writing style of the rating entity. Based on the comparison, the rating indicator may be determined as erroneous or not during filtering by the filtering engine 306. For example, if the writing style matches with the pre-stored writing style of the rating entity, the rating indicator may be considered as valid and otherwise the rating indicator may be considered as erroneous.

In an example, the duplicate ratings analysis engine 952 may be configured to identify multiple rating indicators originating from the same rating entity and for the same rated entity. The filtering engine 306 may remove all such duplicate rating indicators or may altogether consider such rating indicators as erroneous.

In an example, the age mapping engine 954 may determine age of the rating entity from profile information of the rating entity such that if the age of the rating entity meets predefined criteria such as falls within a defined range or beyond a defined range, the rating indicator may be considered erroneous. The predefined criteria may be dependent on the age and other characteristics associated with the rated entity.

The rating frequency analysis engine 956 may determine frequency with which ratings or rating indicators are provided by the rating entity for the rated entity. A predefined threshold may be associated such that if the determined frequency is more than the predefined threshold, the rating indicator may be considered as erroneous. The filtering engine 306 may remove such erroneous rating indicators.

The rating duration analysis engine 958 may determine duration between subsequent rating indicators by the rating entity for the rated entity. A predefined threshold may be associated such that if the determined duration is less than the predefined threshold, the rating indicator may be considered as erroneous. The filtering engine 306 may remove such erroneous rating indicators.

In an example, the rating sources analysis engine 960 may identify sources from where the rating entity submits the rating indicators such as a personal social networking page, a specific website and the like. The filtering engine 306 may consider a rating indicator as erroneous based on certain predefined rules in connection with the rating sources. The filtering engine 306 may consider the rating indicator as erroneous based on the rating sources as specified by the predefined rules.

An output generated by each of the geo-location coordinate analysis engine 946, gender mapping engine 948, writing style analysis engine 950, duplicate ratings analysis engine 952, age mapping engine 954, rating frequency analysis engine 956, rating duration analysis engine 958, and the rating sources analysis engine 960 may be used by a filter circuit 962 which may perform specific processing tasks to filter the erroneous rating indicator based on predefined rules. The filter circuit 962 may include or be coupled to a processor with hardware components specifically designed and configured to perform application specific tasks.

In an example, the filtering engine 306 may be coupled with a trust and reliability index calculator 964. The trust and reliability index calculator 964 may be configured to determine a trust level and a reliability index associated with the rating entity such that the trust level and the reliability index may be determined based on reputation and a historical rating profile of the rating entity. The trust and reliability index may be used by the filter circuit 962 as a parameter to authenticate and filter the erroneous rating indicator. The lesser the trust level and reliability index associated with the rating entity, the higher are the chances of the rating indicator submitted by the rating entity to be erroneous and fraud. The historical rating profile of the rating entity may be indicative of rating behavior of the rating entity for rating a plurality of entities other than the rated entity. In an example, historical rating profiles of several other rating entities may be generated and the historical rating profile may be compared with the historical rating profiles of the several other entities to generate a comparison output. The rating indicator associated with the rating entity may be considered as the erroneous rating indicator based on the comparison output in an example. For example, if the rating behavior as identified based on the historical rating profile varies from an average rating behavior as identified from the several historical rating profiles of several other entities, the rating indicator may be considered as erroneous by the filtering engine 306 and may be removed before performing aggregation. In an example, a baseline rating behavior may be associated with a defined range based on the historical rating profiles of the several other entities such that if the rating behavior of the rating entity is beyond the range, the rating indicator may be considered as erroneous. The rating behavior may be defined in the form of numerical components with the use of various APIs, automated algorithms and semantic intelligence tools.

The rating evaluation unit or rating evaluation engine 308 may include aggregation rules 966, an aggregation engine 968, an aggregate rating comparator 970, a relevancy identification engine 972, and a presentation tier 974. The aggregation rules 966 may be defined to control aggregation tasks such that different combination ways may be used to generate the aggregate rating indicator based on the plurality of individual rating indicators. The aggregation engine 968 may generate the aggregate rating indicator based on the aggregation rules 966.

In an example, a rating indicator category may be associated with a rated entity. For example, a first aggregate rating indicator may be established for a first rated entity based on a plurality of individual rating indicators for the first rated entity. A second aggregate rating indicator may be established for a second rated entity based on a plurality of individual rating indicators for the second rated entity. The first rated entity and the second rated entity may belong to the same rating category. The aggregate rating comparator 970 may compare the first aggregate rating and the second aggregate rating. The relevancy identification engine 972 may identify a relevant identity from among the first entity and the second entity based on a user request submitted to the rating aggregator 108. The user may specify relevancy details such as location of a relevant entity, time of availability at a particular time, geographical proximity of the relevant entity from a specific location, based on trust scores and reliability indices associated with the relevant entity, and the like such that the relevancy identification engine 972 may identify the relevant identity which matches with the user provided details for the relevant entity. In an example, multiple entities may be identified that may match with the user details. The user may in such case select an entity that best matches the user provided details. In case the entity is not available, an alternative entity may be identified from among the multiple entities. For example, the first entity and the second entity may be physicians and the user may want to select the best physician for appointment based on their aggregated rating indicators. The user may select the first entity for example. However, an alternative entity such as the second entity may be selected based on availability at a particular time, based on availability at a particular location, based on geographical proximity from a specific location, and based on comparison of trust scores and reliability indices associated with the first entity and the second entity. In an example, if the first entity is not available, the second entity may be shortlisted.

The presentation tier 974 may be configured to generate an output for presentation on a display unit. The presentation tier 974 may for example publish the first aggregate rating and the second aggregate rating on the display unit such as a website and the like.

Figure 10:
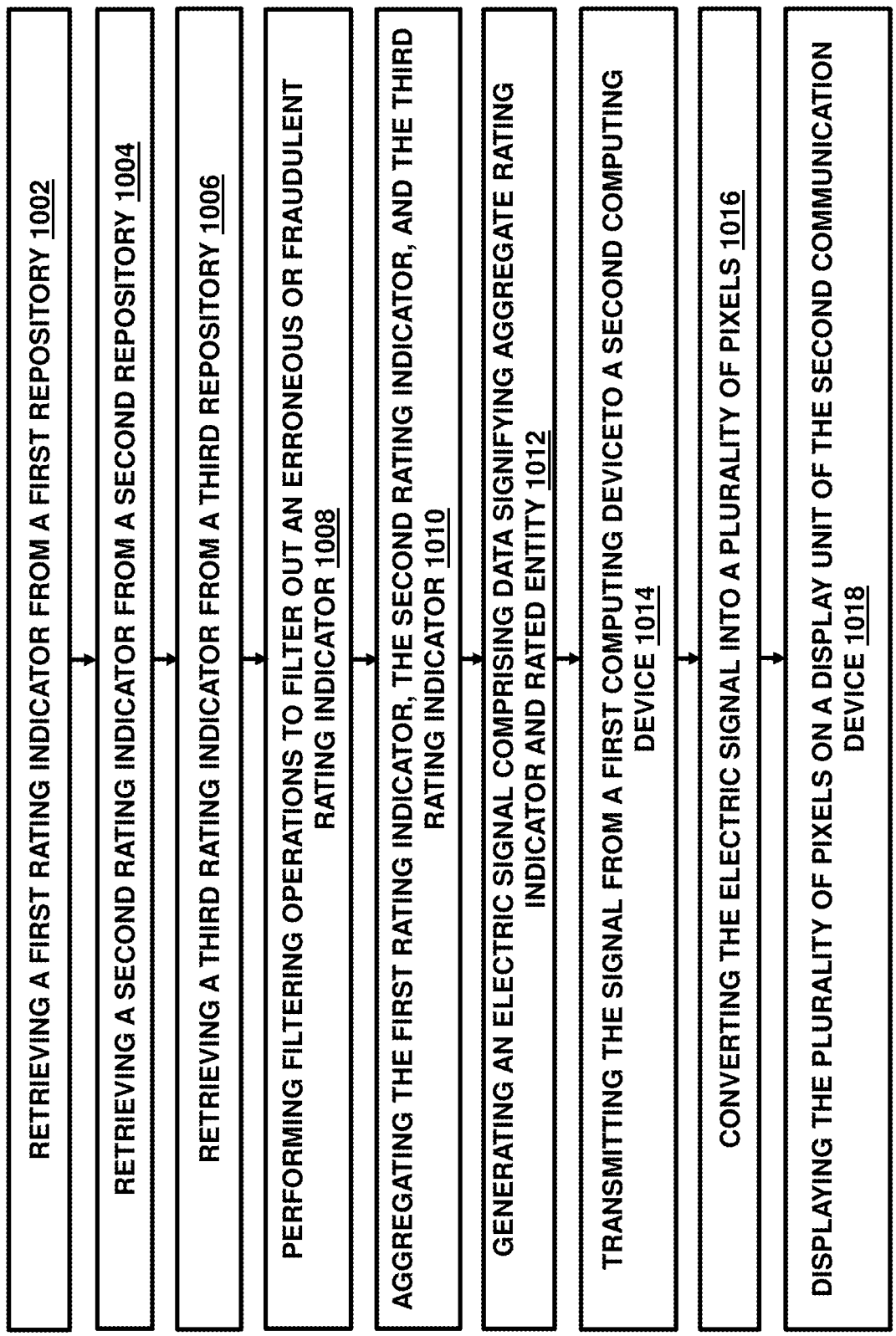
FIG. 10 illustrates a method diagram for aggregation of rating indicators and publishing of an aggregate rating indicator, in accordance with an embodiment herein.

FIG. 10, with reference to FIGS. 1 through 9, illustrates a method diagram for publishing the aggregate rating indicator based on the plurality of discrete rating indicators associated with the rated entity. In an example, the plurality of discrete rating indicators may include a first rating indicator, a second rating indicator, and a third rating indicator. In various examples, there can be even more or less number of rating indicators associated with the rated entity. The method may include searching a plurality of repositories such as web hosted repositories or other storage devices containing the plurality of discrete rating indicators associated with the rated entity. In an example, each of the plurality of rating indicators may include a numerical score component and a sentiment score component. The numerical score component may include numerical-based rating indicators and the sentiment score component may include non-numerical based rating indicators which may include identifiers of expressions, emoticons, emotions, and the like sentiments.

The method may include retrieving the first rating indicator from a first repository at step 1002. The first rating indicator may include a first numerical score component and a first semantic score component. The method may include retrieving the second rating indicator from a second repository at step 1004. The second rating indicator may include a second numeric score component and a second semantic score component. The method may include retrieving the third rating indicator from a third repository at step 1006. The third rating indicator may include a third numeric score component and a third semantic score component. The first rating indicator, the second rating indicator, and the third rating indicator may be stored in the memory circuit 312 which may be equipped with a special purpose processor such as the special purpose processor 116 configured and designed to perform application specific tasks. In various examples, the first rating indicator, the second rating indicator, and the third rating indicator may be retrieved from the plurality of repositories such that the plurality of repositories may include a web-based repository, a social networking engine or a personalized social networking platform section, a healthcare rating indicator agency information source, a local storage unit component or individual local storage component associated with the rated entity or a rating entity, and the like. The individual local storage components may reside on a local computing machine communicatively connected with the special purpose processor 116 through a server component or the server 106. The method may include, in an embodiment, searching the individual local storage components such as the local storage component 924 for a rating indicator provided by an individual to the rated entity. The rating indicator may reside in the local storage components and may include a sentiment score component including sentiments, reviews, comments, and views, and a numerical score component. The special purpose processor 116 may index the rating indicator in the memory circuit 312.

The method may include performing filtering operations to filter out an erroneous or fraudulent rating indicator from among the first rating indicator, the second rating indicator, and the third rating indicator at step 1008. The filtering may be processed by the special purpose processor 116 coupled with or including the filtering engine 306 such that the special purpose processor 116 filters the erroneous or fraudulent rating indicator based on a combination of parameters that have been discussed elsewhere in the document. The parameters may include for example a geo-location coordinate similarity between the rating entity and the rated entity, gender identification, age specifics, frequency of submitting rating indicators for the rated entity by the rating entity, sentiment writing style, duration between subsequent rating indicators by the same rating entity for the same rated entity, duplicate rating indicators provided by the rating entity for the rated entity, use of multiple different rating sources for rating the rated entity by the rating entity, and the like.

At step 1010, the method may include aggregating the first rating indicator, the second rating indicator, and the third rating indicator by the special purpose processor 116 after filtering out the fraudulent or erroneous rating indicator such that the aggregation results in the aggregate rating indicator indicative of an equivalent of the plurality of discrete rating indicators other than the fraudulent rating indicator.

Figure 11:
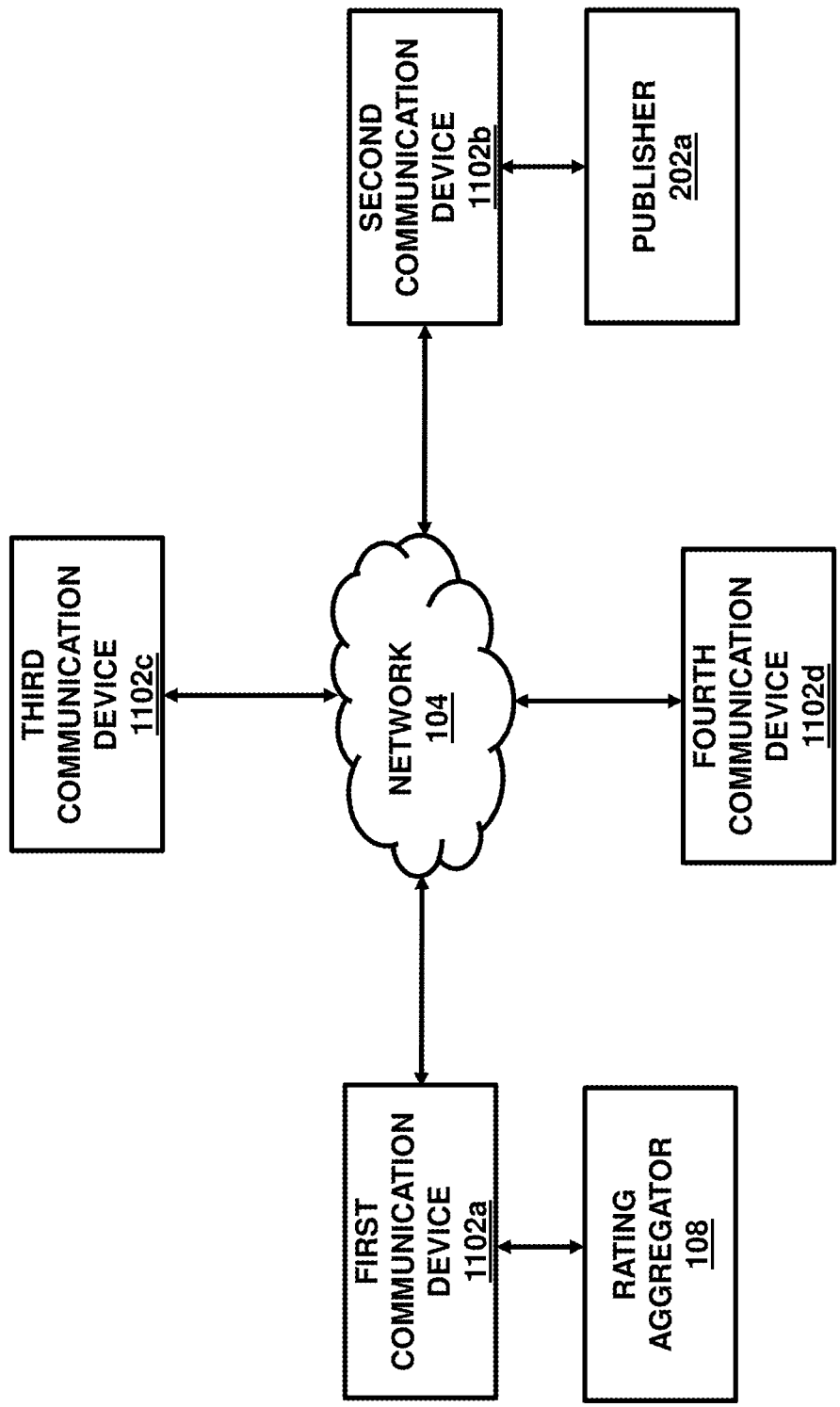
FIG. 11 illustrates an exemplary architecture involving a plurality of computing devices connected over the network, in accordance with an embodiment herein.

The method may include generating an electric signal comprising data signifying the aggregate rating indicator and the rated entity at step 1012. At step 1014, the electric signal may be transmitted from a first computing device 1102*a* (shown in FIG. 11), which may be communicatively and operatively coupled to the special purpose processor 116, to a second computing device 1102*b*. The first computing device 1102*a* and the second computing device 1102*b* may be connected over the network 104 with a plurality of communicatively linked data communication devices 1102*a*, 1102*b*, 1102*c*, and 1102*d* (together referred to as 1102). In an example, the plurality of computing devices 1102 may be associated and connected with various publishers 202. At step 1016, the method may include converting the electric signal into a plurality of pixels. The plurality of pixels may be displayed on a display unit of the second communication device 1102*b* at step 1018 to publish the aggregate rating indicator associated with the rated entity and the data signifying the rated entity. FIG. 11, with reference to FIGS. 1 through 10, illustrates an exemplary architecture involving the plurality of computing devices 1102 connected over the network 104. The first computing device 1102*a* may be associated with the rating aggregator 108. Other computing devices of the plurality of computing devices 1102 may be associated with the publishers 202 from where rating indicators may be retrieved or aggregate rating indicators may be published or displayed.

In an embodiment, the rating indicator category may be associated with the rated entity. The aggregate score is determined for the plurality of discrete rating indicators such that each of the plurality of discrete rating indicators may be linked to the same category. The method may also include determining a trust score, and a reliability index for the first rating indicator, the second rating indicator, and the third rating indicator. The first rating indicator, the second rating indicator, and the third rating indicator may qualify for the aggregation when the trust score and the reliability index exceeds a threshold trust score and a threshold reliability score for a specific rating indicator category identified by a rating indicator category identifier maintained by the memory circuit 312. The rating indicator category identifier may be used to determine and identify the category to which the rated entity belongs to. The rating identifier may for example be associated to signify a physician category or a healthcare category or a finance category, and the like. Different rating indicator categories may be defined with different threshold values of the trust score and the reliability index such that a dynamic trust score and a dynamic reliability index may be associated with the rating indicator category identifiable by the rating indicator category identifier.

In an example, the first rating indicator, the second rating indicator, and the third rating indicator may be associated with a first rated entity such that the aggregate rating indicator identified from the first rating indicator, the second rating indicator, and the third rating indicator may be a first rating indicator associated with the first rated entity. The first aggregate rating indicator may be associated with a first category such that the first rating indicator, the second rating indicator, and the third rating indicator are associated for the same first rating indicator category. The method may further include retrieving a fourth rating indicator category, a fifth rating indicator category, and a sixth rating indicator category associated with a second rated entity for the same rating indicator category identified by the rating indicator category identifier. The method may include filtering out a fraudulent or erroneous rating indicator from among the fourth rating indicator, the fifth rating indicator and the sixth rating indicator by the special purpose processor 116 such that the fraudulent rating indicator is determined by the special purpose processor 116 based on the combination of the parameters as discussed earlier. The fourth rating indicator, the fifth rating indicator, and the sixth rating indicator may be aggregated after filtering out the fraudulent or erroneous rating indicator such that the aggregation results in a second aggregate rating indicator associated with the second rated entity. The method may include comparing the first aggregate rating indicator and the second aggregate rating indicator. The method may include identifying a relevant entity from among the first entity and the second entity based on a user query such that the relevant entity may be identified based on availability at a particular time, based on availability at a particular location, based on geographical proximity from a specific location, and based on comparison of trust scores and reliability indices associated with the first entity and the second entity. The determination of the relevant entity is already discussed above.

In an example, the electric signal may include data signifying the relevant entity and a relevant entity profile such that when the electric signal is transmitted to the second computing device, the data pertinent to the relevant entity and the relevant entity profile may be displayed on the second computing device 1102b. The plurality of pixels may be displayed on the display unit of the second communication device 1102b to publish the data signifying the relevant entity and the relevant entity profile.

In an example, the profile component 938 as discussed earlier may be generated for the rated entity by the rating entity. The profile component 938 may include a computer executable profile of the rated entity which may be stored at and accessible through the social networking platform associated with the rated entity through the social networking engine or social engine 940. The social networking engine 940 may allow dynamically changing user connections including the rating entity and rated entity as dynamically changing user connections among other such connections. The profile component 938 may be accessed by the aggregation engine 968 and/or the filtering engine 306 upon authorization by the rated entity. The aggregation engine 968 may further retrieve the billing component 942 for the rated entity hosted by the third party computing system 944. The billing component 942 may include a billing profile including financial and billing information generated and verified by the third party computing system 944. The billing component 942 and the profile component 938 may include a combination of sentiments, natural texts, numerical scores, and other numerical data. The method may include comparing the billing component 942 and the profile component 938 such that a comparison output may be used as a parameter for aggregating the plurality of discrete rating indicators.

The plurality of individual or discrete rating indicators may be defined in the form of an audio review, a video review, or a visual review. The method may include normalizing the rating indicators to a predefined format by the special purpose processor 116 so that the aggregate rating indicator may be determined.

In an example, the historical rating profile of the rating entity may be created that is indicative of rating behavior of the rated entity for rating of a plurality of other entities. The method may include creating historical rating profiles of a plurality of other rating entities other than the rating entity. The method may include comparing the historical rating profile of the rating entity with the historical rating profiles of the plurality of other rating entities to generate a comparison output. The comparison output may be used by the filtering engine 306 to determine the erroneous or fraudulent rating indicator. For example, a rating indicator such as the first rating indicator may be considered as erroneous if the comparison output reveals substantial difference between the historical profile component of the rating entity and an average rating profile determined based on the historical rating profiles of the plurality of other rating entities.

A few embodiments are further presented herein as numbered examples.

EXAMPLE 1

The embodiments herein disclose system for publishing an aggregate rating indicator based on a plurality of discrete rating indicators associated with a rated entity. The system may include a search engine for searching a plurality of repositories containing the plurality of discrete rating indicators associated with the entity. Each of the plurality of rating indicators may include a numerical score component and a sentiment score component. The system may further include a special purpose processor for retrieving a first rating indicator published on a repository. The first rating indicator may include a first numerical score component and a first sentiment score component. The processor may be configured to retrieve a second rating indicator published on a personalized social networking platform section. The second rating indicator may include a second numeric score component and a second sentiment score component. The processor may be configured to retrieve a third rating indicator published with a local storage component associated with the rated entity or a ratting entity. The third rating indicator may include a third numeric score component and a third sentiment score component. At least one of the first rating indicator, the second rating indicator, and the third rating indicator may be a fraudulent or erroneous rating indicator. The system may include a memory circuit communicatively and operatively connected with the special purpose processor for storing the first rating indicator, the second rating indicator, and the third rating indicator. The system may include a rating filter or filtering engine communicatively coupled with the special purpose processor and the memory circuit for filtering out a fraudulent rating indicator. The fraudulent rating indicator is determined based on a combination of parameters including such as a geo-location coordinate similarity between a rating entity and the rated entity, gender identification, age specifics, frequency of the rating indicator of the rated entity by the rating entity, sentiment writing style, duration between the rating indicator and a subsequent rating indicator by the same rating entity for the same rated entity, duplicate rating indicators provided by the rating entity for the rated entity, use of multiple rating sources for rating the rated entity by the rating entity, and the like. The system may include a rating aggregator communicatively and operatively connected with the special purpose processor for aggregating the first rating indicator, the second rating indicator, and the third rating indicator after filtering out the fraudulent rating indicator such that the aggregation results in an aggregate rating indicator indicative of an equivalent of the plurality of discrete rating indicators other than the fraudulent rating indicator. The system may include an electric signal generator embedded in an electronic circuit and communicatively and operatively connected with the special purpose processor and the memory circuit for generating an electric signal comprising data signifying the aggregate rating indicator and the rated entity. The system may include a transceiver for transmitting the electric signal from a data communication device, communicatively connected with the special purpose processor and the electric signal generator, in a network comprising a plurality of communicatively linked data communication devices. The system may include a signal converter for converting the electric signal into a plurality of pixels to publish the aggregate rating indicator associated with the rated entity and the data signifying the rated entity.

EXAMPLE 2

The system of example 1, wherein the repositories are associated with a rating indicator website, a social networking engine, and a healthcare rating indicator agency information source, and the like.

EXAMPLE 3

The system of example 1 further includes a server component communicatively and operatively coupled with the special purpose processor to access the repositories. The server component is further communicatively coupled with individual local storage components residing on a local computing machine remotely located from the server component and the processor component. The server component may be configured to access the individual local storage components. The server component and the processor component together are configured to search digital information stored on the individual local storage components for a rating indicator provided by an individual to the rated entity. The rating indicator resides in the local storage components and may include sentiments, reviews, comments, and views. The server component and the processor may be configured to index the rating indicator, identified by the sentiments, reviews, comments, and the views, in the memory circuit by the special purpose processor. The special purpose processor is further configured to associate a rating indicator category with the rated entity. The aggregate score may be determined for the plurality of discrete rating indicators such that each of the plurality of discrete rating indicators may be linked to the same category. The special purpose processor may further be configured to determine a trust score, and a reliability index for the first rating indicator, the second rating indicator, and the third rating indicator. The first rating indicator, the second rating indicator, and the third rating indicator may qualify for the aggregation when the trust score and the reliability index exceeds a threshold trust score and a threshold reliability score for a specific rating indicator category identified by a rating indicator category identifier maintained by the memory circuit.

The methods of aggregation of the rating indicators as disclosed herein treat each review and rating as an informative as well as a noisy signal of quality. The methods and systems allow optimization of rating aggregation by processing filtering of the rating indicators based on specific parameters as has been discussed in the document. In order to aggregate the individual rating indicators to get an optimal aggregation rating indicator, the rating indicators are weighted for biases and noise prior to aggregation by the rating aggregator 108 and the filtering engine 306 (or the filter circuit 962). The embodiments herein allow constructing optimal rating indicators for each entity or for each category such as a healthcare delivery organization (HDO) in an example. The optimal rating indicator processed by the filter circuit 962 and aggregated by the aggregation engine 968 reduces the biases or variations due to differences in reviewers or due to differences in accuracy levels of different rating indicators and/or reliability levels among different reviewers.

The processes of filtering and aggregation to determine an aggregate rating indicator pose several challenges. Finding an aggregate rating indicator depends on personalization data and each user or rating entity may possess his biases or preferences which may affect the aggregate rating indicator. Moreover, each rating entity may agree or disagree with their recommendations even on the same matter associated with the same rated entity. The embodiments herein allow a more robust and reliable rating indicators aggregation by filtering the rating indicators using a multi-filtering approach including the use of parameters-based filtering using the filtering engine enabled through a set of hardware appliances and API as discussed above in conjunction with various figures. The multi-filtering approach is further enabled through a second filtering layer with the use of human APIs (application programming interfaces) 1202 as shown in FIG. 12.

Figure 12:
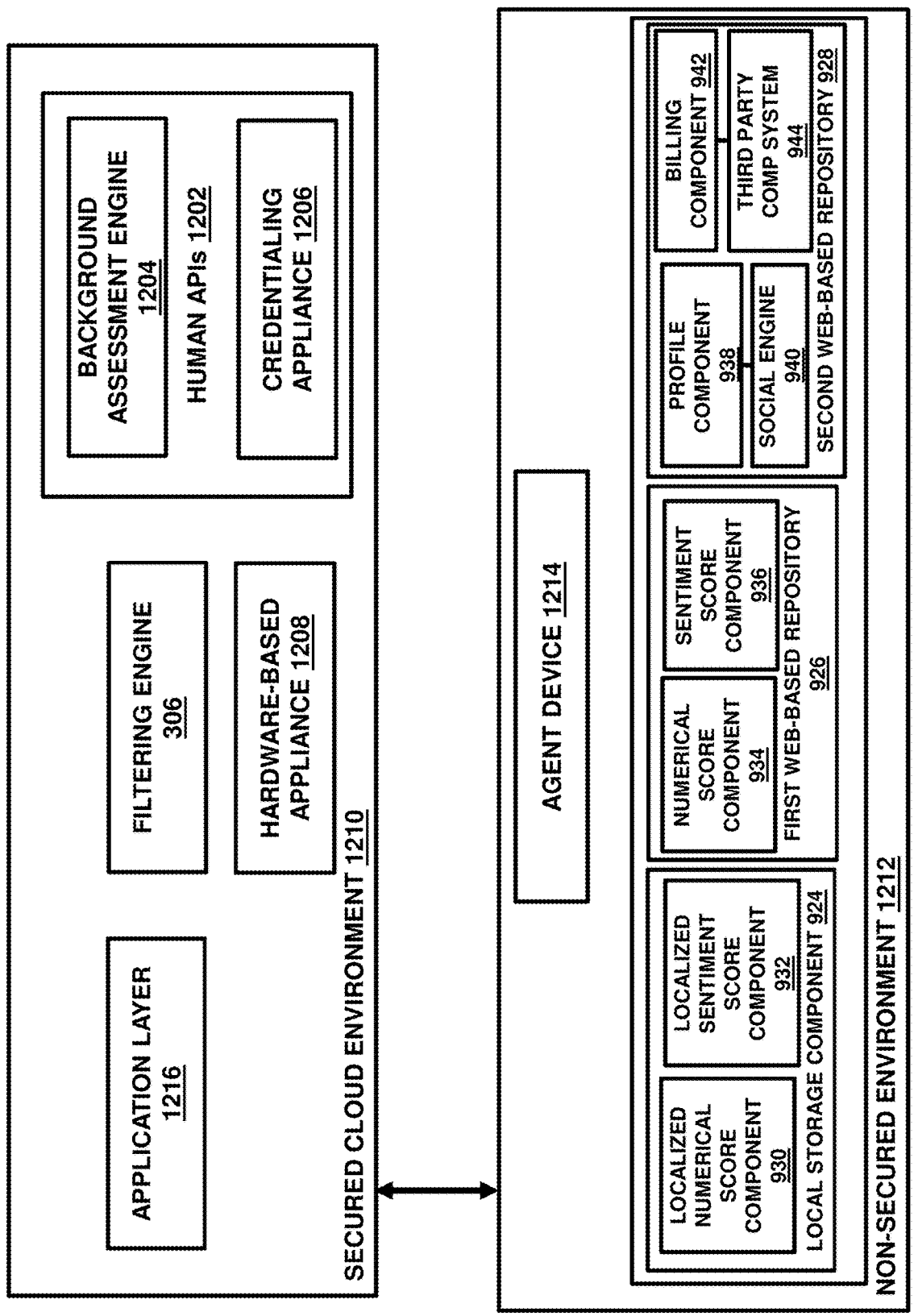
FIG. 12 illustrates an example of filtering of the rating indicators that are obtained from various types of sources through use of a multi-layer filtering approach, in accordance with an embodiment herein.

FIG. 12, with reference to FIGS. 1 through 11, illustrates an example of filtering of the rating indicators that are obtained from various types of sources through the use of the multi-layer filtering approach. The human APIs 1202 initiates manual intervention at specific times to enhance reliability of the rating indicators before aggregation. The human APIs 1202 are added automatically to alert manual intervention once the trust and reliability indices associated with the rating indicators go below a threshold level. The human APIs 1202 can therefore initiate triggers such as for example to perform background check and/or perform credentialing. The human APIs 1202 may initiate an automated phone call or send an email or perform any other service oriented function. The human APIs 1202 may allow background assessment with the use of a background assessment engine 1204 and credentialing with the use of a credentialing appliance 1206. The multi-tier filtering approach of the rating indicators prevents the biases and personalization preferences from impacting the aggregate rating indicator. The multi-tier filtering can for example determine a person rating another wrong person with a similar name. The human APIs 1202 initiate the triggers to review and watch applications and verify by phoning or emailing or double checking through physical means based on the generated triggers through the human APIs 1202.

Furthermore, the use of the sentiment score component as well as the numerical score component makes the task of aggregation even more complex. The rating indicators may be different, of different types, heterogeneous, and originating from different sources such as the local storage component 924, first web-based repository 926, and the second web-based repository 928 associated with the social engine 940 and the like. The aggregating of such rating indicators from such varied sources poses several technologies challenges such as identification of entities that does the ratings. For example, if John Smith submits a rating on the first web-based repository 926 and if John Smith submits another rating on the local storage component 924, the identity of two John Smith being the same persons may be required to be determined. The identity of the rating entity may need to be established for a reliable rating aggregation score or indicator. Similarly, the same person may have rated an entity on the local storage component 924 as well as through a remote web-based repository such as the first web-based repository 926. In such cases, the identity of the rating entity and reliability of the rating needs to be assessed since the two ratings may be duplicates and may require filtration. The filtering engine 306 disclosed in the present document may perform filtering using the various appliances and modules as discussed in conjunction with various figures. Further, the rating indicators obtained from several sources may include rating indicators on different scales. The aggregation engine 968 or the special purpose processor 116 may therefore perform homogenization of the discrete rating indicators prior to aggregation so as to organize the rating indicators in same formats.

Still, the retrieval of different types of rating indicators from different types of repositories accessible through different ways poses even more challenges. For example, a rating indicator may be accessed from a personal social networking platform section. Another rating indicator may be acquired from a personal database which may not be connected to a public network and can be networked privately only after authorization by the rating entity. In such cases, the rating entity may store the recommendations, reviews and ratings reserved with a personal data store. Even further, another rating indicator may be retrieved from a public web-based repository accessible through a public network. The embodiments herein address these challenges by deploying a hardware-based appliance 1208 in a secured cloud environment 1210 of the filtering engine 306. The hardware-based appliance 1208 may get data such as the rating indicators from a non-secured environment 1212 including the various sources of the rating indicators located behind a firewall and push the data to the filtering engine 306 in the secured cloud environment 1210. The hardware-based appliance 1208 is designed to access an agent appliance 1214 dropped in behind the firewall in the non-secured environment 1212 that does all local collection of the rating indicators. The rating indicators are then pushed out in a harmonized way to the secured cloud environment 1210 by the agent device 1214 so that the hardware-based appliance 1208 collects the pushed data, transforms it for harmonizing it, and submits it to the filtering engine 306 prior to aggregation. In an example, harmonization can be done within the secured cloud environment 1210.

The hardware-based appliance 1208 may be connected with the filtering engine 306 to trigger the human APIs 1202 and several custom applications deployed through an application layer 1216 with automated applications. The automated applications may be executed through such as the geo-location coordinate analysis engine 946, gender mapping engine 948, writing style analysis engine 950, duplicate ratings analysis engine 952, age mapping engine 954, rating frequency analysis engine 956, rating duration analysis engine 958, rating sources analysis engine 960, and the like. The geo-location coordinate analysis engine 946 may generate a first input component indicative of proximity of the rated entity with the rating entity. The gender mapping engine 948 may generate a second input component indicative of a gender specific value signifying validity of the rating indicator based on gender specific comparison obtained by comparing with pre-defined gender specific definitions. The writing style analysis engine 950 may generate a third input component indicative of validity of the rating indicator obtained by comparison of the writing style with a pre-stored writing style of the rating entity. The duplicate rating analysis engine 952 may generate a fourth input component indicative of validity of the rating indicator based on analysis of duplicate ratings from seemingly same persons or rating entities. The age mapping engine 954 may generate a fifth input component indicative of age specific value signifying validity of the rating indicator based on age specific comparison obtained by comparing with pre-defined age specific definitions. The rating frequency analysis engine 956 generates a sixth input component indicative of validity of the rating indicator based on comparison of the rating frequency with a pre-stored rating frequency threshold. The rating duration analysis engine 958 may generate a seventh input component indicative of validity of the rating indicator based on comparison of the rating duration with a pre-stored rating duration threshold. The rating sources analysis engine 960 may generate an eighth input component indicative of validity of the rating indicator based on comparison of the variance in the rating sources such as the first web-based repository 926, the second web-based repository 928, the local storage component or local storage unit or device 924 and the like. In an example, the first input component, the second input component, the third input component, the fourth input component, the fifth input component, the sixth input component, the seventh input component, and the eighth input component may be generated through the application layer 1216 deployed within the secured cloud environment 1210 and these various input components may be submitted by the hardware-based appliance 1208 to the filtering engine 306 such that values of the various input components decide initiation and triggering of the human APIs 1202 for reliability assurance of the rating indicators during filtering process and prior to the aggregation. The various input components may be computer executable.

In an embodiment, the appliance 1208 may be an extensible agent appliance. The appliance 1208 may be configured to host a plug and play cloud agent. The plug and play agent may consist of a central host such that various functionalities may be added to it as separate plug-ins. New plug-ins may be automatically added into the plug and play agent. The plug and play agent can be installed by the server 106 or the special purpose processor 116. The appliance 1208 is capable of launching a gateway application configured to pair a connected computing machine hosting a repository such as the local storage component 924 or the first web-based repository 926 or the second web-based repository 928 with the server 106 or the agent device 1214 to allow access of computer executable rating indicators residing on the repositories by the agent device 1214. The gateway application allows and automates transfer of the computer executable rating indicators from the computing machine to the server 106 or the appliance through the agent device 1214.

Determining geographical location coordinates and comparisons between geo coordinates of the rating entity and the rated entity to determine trustworthiness of a rating indicator may involve complex challenges such as who rated the rating entity and whether the rated entity was in proximity of the rating entity so as to ensure reliability of the rating indicator. The application layer 1216 may deploy the geo-location coordinate analysis engine 946 to determine proximity of the rated entity with the rating entity and to determine whether the rated entity and the rated entity are in a valid geographical area or boundary by establishing a geographical proximity boundary. And, when the rating is done, the geo-location coordinate analysis engine 946 prevents completely or adjusts the rating indicator based on whether the rating entity may be the person wanted to rate for example John Smith in NYC but accidentally rated John Smith in Chicago or whether the rating entity and the rated entity are beyond the valid and established geographical proximity boundary. The geo-location coordinate analysis engine 946 may enable IP based geography capabilities, WiFi triangulated or coordinated capabilities with WiFi adaptors, physical GPS to deliver geographical coordinate information, and the like.

In an example, the application layer 1216 may deploy an appliance to execute time-based comparisons such as to assess for temporal parameters. For example, an office for which a rating is submitted at a particular time was closed and hence the rating indicator so generated may be erroneous.

The embodiments herein may be embodied as a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon. Such non-transitory computer readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor, and may be configured, for example, as a kiosk.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 13:
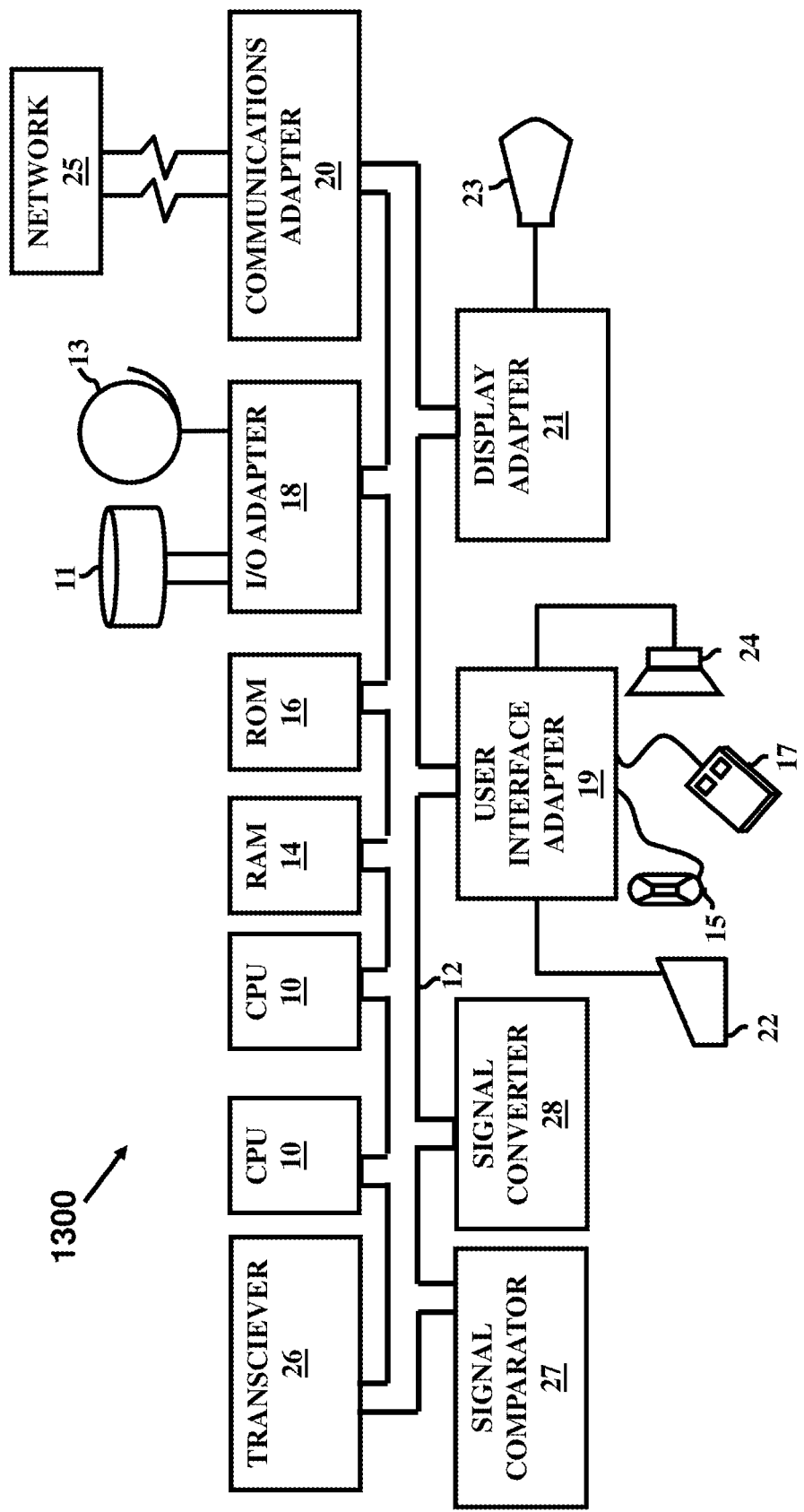
FIG. 13 illustrates a computer system that may be used in accordance with the embodiments herein.

A representative hardware environment for practicing the embodiments herein is depicted in FIG. 13, with reference to FIGS. 1 through 12. This schematic drawing illustrates a hardware configuration of an information handling/computer system 1300 in accordance with the embodiments herein. The system 1300 comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system 1300 can read the inventive instructions on the program storage devices and follow these instructions to execute the methodology of the embodiments herein. The system 1300 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A computer-implemented method for publishing an aggregate rating indicator based on a plurality of discrete rating indicators associated with a rated entity, the method comprising:
    searching a plurality of repositories containing the plurality of discrete rating indicators associated with the rated entity;
    retrieving a first rating indicator published on a web-based repository;
    retrieving a second rating indicator published on a personalized social networking platform section;
    retrieving a third rating indicator stored with a local storage component associated with the rated entity or a rating entity, wherein at least one of the first rating indicator, the second rating indicator, and the third rating indicator comprises a first fraudulent rating indicator;
    filtering the first fraudulent rating indicator from among the first rating indicator, the second rating indicator, and the third rating indicator, wherein the first fraudulent rating indicator is determined based on computer executable input components including a geo-location coordinate similarity between a rating entity and the rated entity, a demographic identification, a frequency of the rating indicator of the rated entity by the rating entity, a sentiment writing style, a duration between the rating indicator and a subsequent rating indicator by the same rating entity for the same rated entity, a duplication of rating indicators provided by the rating entity for the rated entity, and a use of multiple different rating sources for rating the rated entity by the rating entity;
    aggregating a filtered combination of the first rating indicator, the second rating indicator, and the third rating indicator to provide an aggregate rating indicator comprising an equivalent of the plurality of discrete rating indicators other than the first fraudulent rating indicator;
    generating an electric signal comprising data signifying the aggregate rating indicator and the rated entity;
    converting the electric signal into a plurality of pixels;
    and displaying the plurality of pixels on a display unit of a communication device.

2. The method of claim 1, wherein the plurality of repositories is associated with a rating indicator website, a social networking engine, and a healthcare rating indicator agency information source.

3. The method of claim 1, further comprising: searching the local storage component for a rating indicator submitted by an individual for the rated entity, wherein the rating indicator comprises sentiments, reviews, comments, and views; and indexing the rating indicator, identified by the sentiments, reviews, comments, and the views.

4. The method of claim 1, further comprising associating a rating indicator category with the rated entity, wherein the aggregate score is determined for the plurality of discrete rating indicators such that each of the plurality of discrete rating indicators are linked to the same category.

5. The method of claim 4, further comprising determining a trust score, and a reliability index for the first rating indicator, the second rating indicator, and the third rating indicator, wherein the first rating indicator, the second rating indicator, and the third rating indicator qualifies for the aggregation when the trust score and the reliability index exceeds a threshold trust score and a threshold reliability score for a specific rating indicator category identified by a rating indicator category identifier.

6. The method of claim 5, wherein the rated entity comprises a first entity and the aggregate rating indicator comprises a first aggregate rating indicator, the method further comprising: retrieving a fourth rating indicator, a fifth rating indicator, and a sixth rating indicator associated with a second entity for the same rating indicator category identified by the rating indicator category identifier; filtering a second fraudulent rating indicator from among the fourth rating indicator, the fifth rating indicator and the sixth rating indicator; aggregating the fourth rating indicator, the fifth rating indicator, and the sixth rating indicator after filtering the second fraudulent rating indicator such that the aggregation results in a second aggregate rating indicator; comparing the first aggregate rating indicator and the second aggregate rating indicator; and identifying a relevant entity from among the first entity and the second entity, wherein the relevant entity is identified based on any of an availability at a particular time, an availability at a particular location, a geographical proximity from a specific location, and a comparison of trust scores and reliability indices associated with the first entity and the second entity.

7. The method of claim 6, further comprising: generating an electric signal comprising data signifying the relevant entity and a relevant entity profile; converting the electric signal into a plurality of pixels; and displaying the plurality of pixels on the display unit of the communication device to publish the data signifying the relevant entity and the relevant entity profile.

8. The method of claim 6, wherein parameters for aggregating the plurality of discrete ratings comprises a comparison output obtained from a profile component and a billing component of the rated entity, wherein the profile component comprises a computer executable profile of the rated entity generated by the rating entity and accessible through a social engine associated with a social networking platform with dynamically changing user connections, and the billing component comprises a billing profile including financial and billing information generated and verified by a third party computing system such that the profile component and the billing component include a combination of sentiments, natural texts, numerical scores, and other numerical data.

9. The method of claim 1, wherein the first rating indicator is defined in the form of an audio review, the second rating indicator is defined in the form of a video review, and the third rating indicator is defined in the form of a visual review, the method further comprising normalizing and standardizing the first rating indicator, the second rating indicator, and the third rating indicator to a predefined format by the processor.

10. The method of claim 1, wherein the filtering comprises: creating a historical rating profile of the rating entity that is indicative of rating behavior of the rated entity for rating of a plurality of other entities; creating historical rating profiles of a plurality of other rating entities other than the rating entity; comparing the historical rating profile of the rating entity with the historical rating profiles of the plurality of other rating entities to generate a comparison output; and considering a rating indicator from among the first rating indicator, the second rating indicator, and the third rating indicator as the first fraudulent rating indicator based on the comparison output.

11. A system for publishing an aggregate rating indicator based on a plurality of discrete rating indicators associated with a rated entity, the system comprising:

a search engine for searching a plurality of repositories containing the plurality of discrete rating indicators associated with the entity;

a processor for:

retrieving a first rating indicator published on a web-based repository;

retrieving a second rating indicator published on a personalized social networking platform section;

and retrieving a third rating indicator published with a local storage component associated with the rated entity or a rating entity, wherein at least one of the first rating indicator, the second rating indicator, and the third rating indicator comprises a first fraudulent rating indicator;

a memory operatively connected to the processor for storing the first rating indicator, the second rating indicator, and the third rating indicator;

a filter communicatively coupled to the processor and the memory for filtering the first fraudulent rating indicator, wherein the first fraudulent rating indicator is determined based on computer executable input components including a geo-location coordinate similarity between a rating entity and the rated entity, a demographic identification, a frequency of the rating indicator of the rated entity by the rating entity, a sentiment writing style, a duration between the rating indicator and a subsequent rating indicator by the same rating entity for the same rated entity, a duplication of rating indicators provided by the rating entity for the rated entity, and a use of multiple different rating sources for rating the rated entity by the rating entity;

a rating aggregator operatively connected to the processor for aggregating the first rating indicator, the second rating indicator, and the third rating indicator after filtering the first fraudulent rating indicator such that the aggregation results in an aggregate rating indicator indicative of an equivalent of the plurality of discrete rating indicators other than the fraudulent rating indicator;

an electric signal generator operatively connected to the processor and the memory for generating an electric signal comprising data signifying the aggregate rating indicator and the rated entity;

a transceiver for transmitting the electric signal;

and a signal converter for converting the electric signal into a plurality of pixels to publish the aggregate rating indicator associated with the rated entity and the data signifying the rated entity.

12. The system of claim 11, wherein the web-hosted repositories are associated with a rating indicator website, a social networking engine, and a healthcare rating indicator agency information source.

13. The system of claim 11, further comprising a server operatively connected to the processor to access the repositories, wherein the server is communicatively coupled with individual local storage components residing on a local computing machine remotely located from the server and the processor, the server configured to access the individual local storage components, the server and the processor together configured to: search digital information stored on the individual local storage components for a rating indicator provided by an individual to the rated entity, wherein the rating indicator residing in the local storage components comprises sentiments, reviews, comments, and views; and index the rating indicator, identified by the sentiments, reviews, comments, and the views, in the memory by the processor.

14. The system of claim 11, wherein the processor is further configured to associate a rating indicator category with the rated entity, wherein the aggregate score is determined for the plurality of discrete rating indicators such that each of the plurality of discrete rating indicators are linked to the same category.

15. The system of claim 13, wherein the processor is further configured to determine a trust score, and a reliability index for the first rating indicator, the second rating indicator, and the third rating indicator, wherein the first rating indicator, the second rating indicator, and the third rating indicator qualifies for the aggregation when the trust score and the reliability index exceeds a threshold trust score and a threshold reliability score for a specific rating indicator category identified by a rating indicator category identifier maintained by the memory.

16. The system of claim 14, wherein the rated entity is a first entity and the aggregate rating indicator is a first aggregate rating indicator, and wherein the processor is further configured to: retrieve a fourth rating indicator, a fifth rating indicator, and a sixth rating indicator associated with a second entity for the same rating indicator category identified by the rating indicator category identifier; filter a second fraudulent rating indicator from among the fourth rating indicator, the fifth rating indicator and the sixth rating indicator by the processor; aggregate the fourth rating indicator, the fifth rating indicator, and the sixth rating indicator after filtering the second fraudulent rating indicator such that the aggregation results in a second aggregate rating indicator; compare the first aggregate rating indicator and the second aggregate rating indicator; and identify a relevant entity from among the first entity and the second entity, wherein the relevant entity is identified based on any of an availability at a particular time, an availability at a particular location, a geographical proximity from a specific location, and a comparison of trust scores and reliability indices associated with the first entity and the second entity.

17. The system of claim 15, wherein: the signal generator is further configured to generate an electric signal comprising data signifying the relevant entity and a relevant entity profile; the transceiver is further configured to transmit the electric signal; and the signal converter is further configured to convert the electric signal into a plurality of pixels to publish the data signifying the relevant entity and the relevant entity profile.

18. The system of claim 11, wherein the transceiver transmits the electric signal to a communication device, and wherein the plurality of pixels is displayed on a display unit of the communication device.

19. The system of claim 11, wherein the processor comprises a special purpose processor.

20. A computer-implemented method for publishing an aggregate rating indicator based on a plurality of discrete rating indicators associated with a rated entity, the method comprising:
searching a plurality of repositories containing the plurality of discrete rating indicators associated with the rated entity;
retrieving a plurality of rating indicators published on a combination of a web-based repository and a personalized social networking platform section, wherein at least one of the plurality of rating indicators comprises a fraudulent rating indicator;
filtering the fraudulent rating indicator based on computer executable input components including a geo-location coordinate similarity between a rating entity and the rated entity, a demographic identification, a frequency of the rating indicator of the rated entity by the rating entity, a sentiment writing style, a duration between the rating indicator and a subsequent rating indicator by the same rating entity for the same rated entity, a duplication of rating indicators provided by the rating entity for the rated entity, and a use of multiple different rating sources for rating the rated entity by the rating entity;
aggregating a filtered combination of the plurality of rating indicators to provide an aggregate rating indicator comprising an equivalent of the plurality of discrete rating indicators other than the fraudulent rating indicator;
generating an electric signal comprising data signifying the aggregate rating indicator and the rated entity;
converting the electric signal into a plurality of pixels;
and displaying the plurality of pixels on a display unit of a communication device.

* * * * *